US009836651B2

(12) United States Patent
Matoba et al.

(10) Patent No.: US 9,836,651 B2
(45) Date of Patent: Dec. 5, 2017

(54) DISPLAYING INFORMATION RELATING TO A DESIGNATED MARKER

(71) Applicant: International Business Machines Corporation, Armonk, NY (US)

(72) Inventors: Nobumitsu Matoba, Tokyo (JP); Yasutaka Nishimura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 14/745,602

(22) Filed: Jun. 22, 2015

(65) Prior Publication Data
US 2016/0048732 A1    Feb. 18, 2016

(30) Foreign Application Priority Data
Aug. 14, 2014   (JP) .................................. 2014-165336

(51) Int. Cl.
*G09G 5/00*    (2006.01)
*G06K 9/00*    (2006.01)
(Continued)

(52) U.S. Cl.
CPC ............ *G06K 9/00671* (2013.01); *G06T 7/73* (2017.01); *G06K 2009/3225* (2013.01); *G06T 2207/30204* (2013.01)

(58) Field of Classification Search
CPC .............................. G06T 19/006; G06T 19/00
(Continued)

(56) References Cited

U.S. PATENT DOCUMENTS

| 2004/0046779 A1* | 3/2004 | Asano ................ G06K 9/00664 715/716 |
| 2006/0210192 A1* | 9/2006 | Orhun ...................... G06K 9/32 382/275 |

(Continued)

FOREIGN PATENT DOCUMENTS

| JP | 2001082971 | 3/2001 |
| JP | 2004048674 | 2/2004 |

(Continued)

OTHER PUBLICATIONS

Clark, A., Green, R. and Grant, R.: 2008, "Perspective correction for improved visual registration using natural features", Image and Vision Computing New Zealand, 2008. IVCNZ 2008. 23$^{rd}$ International Conference, pp. 1-6.*

(Continued)

*Primary Examiner* — Jin Ge
(74) *Attorney, Agent, or Firm* — Jared Chaney

(57) ABSTRACT

A method and system for displaying information relating to a designated marker is provided. An image including the designated marker is acquired. The designated marker is extracted from the acquired image. A type of the designated marker is identified from the extracted marker. The identified type of the designated marker is communicated to a server, and in response, marker information identified from the type of the designated marker is obtained from the server. The marker information relates to the designated marker and identifies at least two other markers. Relative positional information of the device in relation to the extracted marker is determined. A displayed informational image includes the designated marker and at least one other marker of the at least two other markers, which are displayed in accordance with a determined relative position between (Continued)

the designated marker and each marker of the at least one other marker.

20 Claims, 22 Drawing Sheets

(51) Int. Cl.
    *G06T 7/73*     (2017.01)
    *G06K 9/32*     (2006.01)

(58) Field of Classification Search
    USPC ........................................................ 345/633
    See application file for complete search history.

(56) References Cited

U.S. PATENT DOCUMENTS

| | | | | |
|---|---|---|---|---|
| 2010/0149399 | A1* | 6/2010 | Mukai | G01C 21/20 348/333.02 |
| 2011/0258175 | A1* | 10/2011 | Kim | G06F 17/30864 707/709 |
| 2012/0218299 | A1* | 8/2012 | Hayakawa | A63F 13/655 345/633 |
| 2012/0232976 | A1* | 9/2012 | Calman | G06Q 30/02 705/14.25 |
| 2013/0093759 | A1* | 4/2013 | Bailey | G09G 5/00 345/419 |
| 2014/0247268 | A1* | 9/2014 | Drucker | G06T 11/206 345/440.2 |
| 2014/0247278 | A1* | 9/2014 | Samara | G06K 17/0016 345/633 |
| 2015/0265922 | A1* | 9/2015 | Yamane | A63F 13/525 463/31 |

FOREIGN PATENT DOCUMENTS

| | | |
|---|---|---|
| JP | 2004258928 | 9/2004 |
| JP | 2005182350 | 7/2005 |
| JP | 2008225913 | 9/2008 |
| JP | 2008250801 | 10/2008 |
| JP | 2010256974 | 11/2010 |
| JP | 2013092887 | 5/2013 |
| WO | WO2007148393 | 12/2007 |

OTHER PUBLICATIONS

M. Hirzer, "Marker Detection for Augmented Reality Applications," Inst. For Computer Graphics and Vision, Graz University of Technology, Austria. 2008.*

Tateno et al., A Nested Marker for Augmented Reality, Mar. 10, 2007 to Mar. 14, 2007, ISBN: 1-4244-0905-5, pp. 259-262.

Information Materials for IDS, Date of JPO Office Action: dated Apr. 26, 2016, 2 pages.

\* cited by examiner

FIG. 10

| Marker | Distance to Endpoint device | Orientation Relative to Endpoint device | Degree of Importance | Display Order Specifying Value |
|---|---|---|---|---|
| Specified Marker | 1 | 0.2 | 10 | 13 |
| Specified Marker A | 2.5 | 2 | 5 | 27.5 |
| Specified Marker B | 2.5 | 2 | 10 | 32.5 |
| Specified Marker C | 3 | 0.8 | 5 | 16 |
| Specified Marker D | 10 | 1.5 | 1 | 26 |

DISPLAYING INFORMATION RELATING TO A DESIGNATED MARKER

TECHNICAL FIELD

The present invention relates to a technology in which an image of a marker is captured by an imaging means, and information identified on the basis of the captured image is presented.

BACKGROUND

There is an existing technology in which a marker identified by geometric features is captured by an endpoint device with a camera function, and the relative position of the endpoint device and the marker is identified on the basis of the image taken of the marker. This technology can be used to present information associated with a marker to an endpoint device whose position relative to the marker has been identified.

BRIEF SUMMARY

The present invention provides a method, and an associated system and computer program product, for displaying information relating to a designated marker. The system includes an endpoint device that comprises a display unit. An image acquiring unit of the endpoint device acquires an image including the designated marker. The device extracts the designated marker from the acquired image. The device identifies a type of the designated marker from the extracted marker. The device communicates the identified type of the designated marker to a server external to the device and in response, obtains, from the external server, marker information relating to the designated marker. The obtained marker information comprises a reference size and shape of the designated marker and an identification of a plurality of other markers related to the designated marker. The marker information in the external server is based on the identified type of the designated marker. The device ascertains a size and shape of the extracted marker from analysis of the extracted marker. The device calculates relative positional information of the device in relation to the extracted marker from analysis of differences between the ascertained size and shape of the extracted marker and the obtained reference size and shape of the designated marker. The device determines a relative position between the designated marker and each marker of the plurality of other markers. The device displays an informational image on the display unit. The displayed image comprises the designated marker and at least one other marker of the plurality of other markers. The designated marker and the at least one other marker are displayed in accordance with the determined relative position between the designated marker and each marker of the at least one other marker.

BRIEF DESCRIPTION OF THE DRAWINGS

FIG. 10 is a table showing an example of display priority settings for objects, in accordance with embodiments of the present invention.

DETAILED DESCRIPTION

Figure 1:
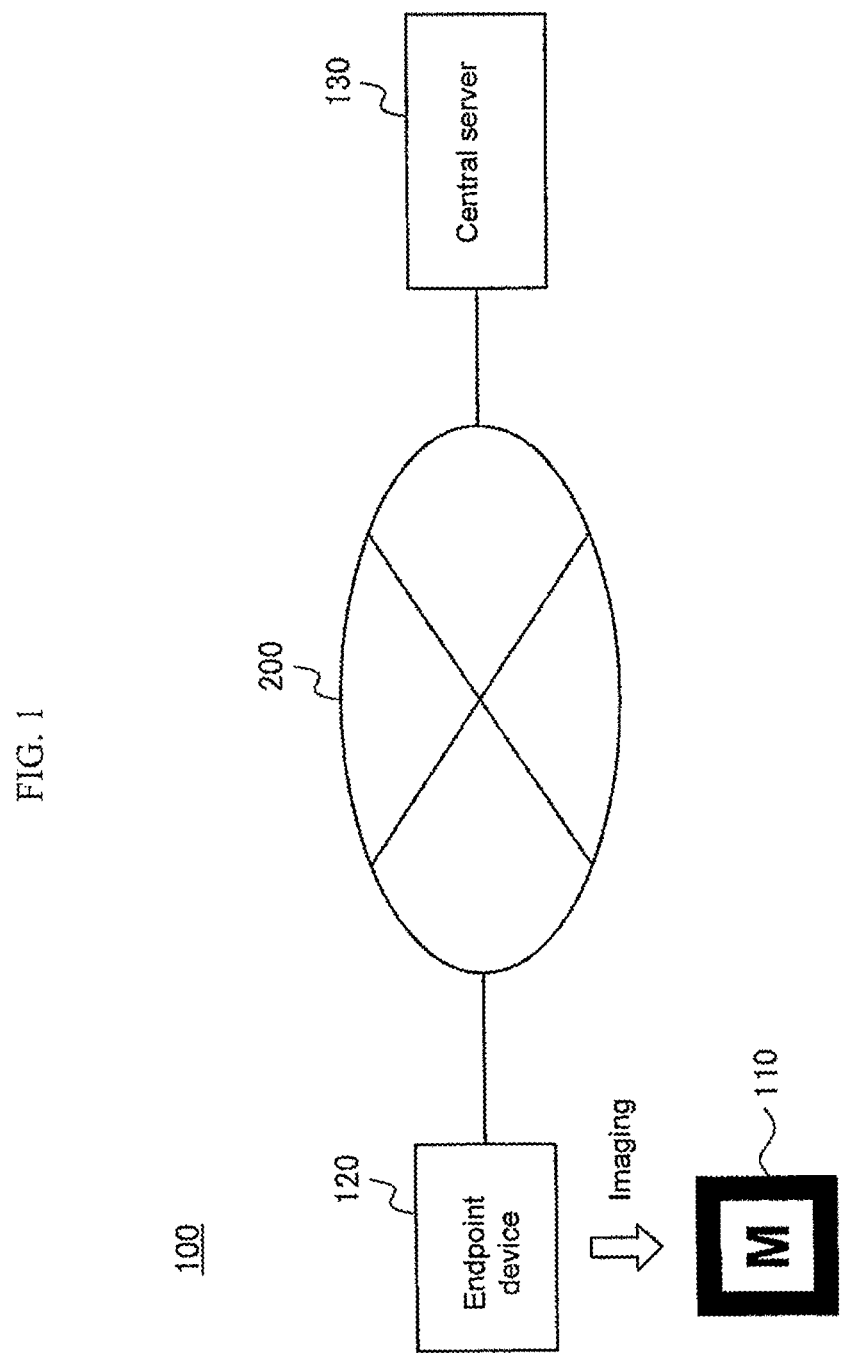
FIG. 1 is a diagram showing an embodiment of the information presenting system, in accordance with embodiments of the present invention.

The following is a detailed explanation of an embodiment of the present invention with reference to the appended drawings.

In technologies used to acquire information associated with a captured marker, time and effort is required to capture a marker using the endpoint device each time information associated with a marker is desired. Also, in this type of technology, information associated with a marker can only be acquired within the imaging range of the endpoint device.

Therefore, embodiments of the present invention increase the convenience of systems in which information is acquired by capturing images of markers using an endpoint device.

Embodiments of the present invention are realized as a system for presenting information identified on the basis of a marker, and the system includes a server for managing markers, and an endpoint device for acquiring information related to markers from the server and displaying the information.

The server includes a storage unit for storing definition information used to identify markers, additional information associated with positions specified by markers, and related information indicating the relationship to other markers; a data processing unit for identifying other markers associated with a marker on the basis of related information when at least one marker has been identified, and retrieving additional information on the marker and any other marker; and a transmitting and receiving unit for receiving information identifying at least one marker from an endpoint device, and transmitting to the endpoint device additional information on the marker and any other marker retrieved from the storage device by the data processing unit on the basis of the designated marker. The endpoint device includes an image acquiring unit for acquiring an image; a display unit for displaying an image; an image processing unit for extracting an image of the marker from an image acquired by the image acquiring unit, and processing the image to identify the marker; a transmitting and receiving unit for receiving from the server additional information on the marker identified by the image processing unit, related information indicating the relationship between the marker and any other marker associated with the marker, and additional information on any other marker; a position calculating unit for calculating the relative positional relationship between the device itself and the marker on the basis of the image of the marker acquired by the image acquiring unit, and calculating the relative positional relationship between the device itself and another marker on the basis of the position information on the marker and position information on any other marker associated with the marker; and a display control unit for generating an information presenting image having an information display added to the image for presenting information related to the marker on the basis of additional information added to the marker identified by the information processing unit and additional information added to any other marker associated with the marker on the basis of the positional relationship calculated by the position calculating unit, and for displaying the information presenting image on the display unit.

In one embodiment, the display control unit generates the information presenting image using the image acquired by the image acquiring unit as the image for presenting information related to the marker.

In one embodiment, the display control unit adds in a different way to the information presenting image generated by the display control unit an information display based on additional information on the marker identified by the image processing unit, and an information display based on additional information on any other marker associated with the marker. Also, the display control unit adds in a different way to the information presenting image generated by the display control unit an information display based on additional information on a marker not located in the range shown in the information presenting image, and an information display based on additional information on a marker located in the range shown in the information presenting image. In addition, the display control unit establishes a display priority for the information display of each marker on the basis of the additional information for each marker, and adds the information displays having a high display priority to the information presenting image for prioritized display. Also, the display control unit generates an image of a list of markers on the basis of additional information on the marker identified by the image processing unit and additional information on any other marker associated with the marker, displays the image of the list on the display unit, and generates an information presenting image having an information display added on the basis of the additional information on the marker selected among the markers displayed in the list image.

In addition, in the endpoint device, the position calculating unit calculates the relative positional relationship between the device itself and any other marker on the basis of the position information for the marker identified by the image processing unit and the position information for another marker selected by the operator, and the display control unit generates, on the basis of the positional relationship calculated by the position calculating unit, an information presenting image having an information display added on the basis of at least the additional information added to the other marker. Then, the display control unit may display on the information presenting image, when the operator has selected more than one other marker, a representative position identified on the basis of the positions of the other markers. In order to achieve this object, the present invention can also be realized as the following method. This method is a method for presenting information identified on the basis of a marker, and includes the steps of: acquiring an image including the marker; extracting an image of the marker from the acquired image, and processing the image to identify the marker; calculating the relative positional relationship between the device itself and the marker on the basis of the image of the marker; acquiring additional information on the marker identified by the image processing, and additional information on any other marker associated with the marker; calculating the relative positional relationship between the device itself and any other marker on the basis of the additional information on the designated marker and the positional information on any other marker included in the acquired additional information; and generating an information presenting image having an information display added to the image for presenting information related to the marker on the basis of additional information added to the marker identified by the information processing and additional information added to any other marker associated with the marker on the basis of the calculated relative positional relationship between the device itself and each marker, and displaying the information presenting image on a display device.

The program can also be realized as a program for controlling a computer to perform each of the functions of the device described above, or a program executing in a computer the processing corresponding to each of the steps of the method described above. The program can be stored and distributed on a magnetic disk, optical disk, semiconductor memory device or other recording medium, or can be distributed and provided via a network.

The present invention is able to acquire more information related to markers in systems in which information is acquired by capturing images of markers using an endpoint device, thereby increasing the convenience of these systems.

FIG. 1 is a diagram showing an embodiment of the information presenting system, in accordance with embodiments of the present invention. The information presenting system 100 in FIG. 1 includes a marker 110, an endpoint device 120, and a central server 130. The endpoint device 120 is a first hardware device and the central server 130 is a second hardware device. The endpoint device 120 and the central server 130 are connected via a computer network 200. The endpoint device 120 in the present embodiment is a portable information terminal (information processing device) including a camera function and display function. The endpoint device 120 can be connected to the computer network 200 via a data communication line in a mobile communication system for mobile phones, or a wireless LAN (local area network).

The endpoint device 120 in one embodiment acquires an image of the marker 110 using the camera function, and displays the image of the marker 110 and additional information added to the marker 110 using the display function. In other words, the endpoint device 120 adds additional information to the image of the marker 110 taken by the camera function, and shows this information on the display screen of the display function. Only one marker 110 and endpoint device 120 are shown in FIG. 1, but the information presenting system 100 in the present invention generally includes one or more markers 110 and one or more endpoint devices 120.

A marker 110 is a label specifying a position at which additional information has been set. It is, for example, an augmented reality (AR) marker in an image recognition-type augmented reality (AR) system. An image with a predetermined pattern (that is, an image of a predetermined shape and/or size) is used in the marker 110. For example, a simple shape such as a square with a predetermined side length is shown illustratively in FIG. 1. In addition to images with a unique pattern, existing labeling that meets pre-established standards can be used as markers 110 in the present invention. For example, code images with an established shape and size such as QR Codes® (registered trademark) can be used. Because any image of a predetermined shape and size can be used as a marker 110, road signs and other signage with uniform standards can be also be used as markers 110. Two-dimensional images may be used as markers 110, but three-dimensional patterns may also be used.

The following is a more detailed explanation of the configuration of the markers 110. As described in greater detail below, markers 110 are captured as images by an imaging means inside an endpoint device 120. The type of marker 110 can be recognized by performing an image analysis on the image of a marker 110 captured by an endpoint device 120, and the relative positional relationship between the marker 110 and the endpoint device 120 can be calculated. For this reason, markers 110 are provided with features allowing the relative positional relationship between a marker 110 and an endpoint device 120 to be calculated on the basis of an image of the marker 110 captured by an endpoint device 120. More specifically, the markers 110 are provided with geometric features enabling a marker 110 to be identified as a marker (referred to below as geometric elements), and also provided with features enabling the type of marker 110 to be identified (referred to below as symbolic elements).

Figure 2:
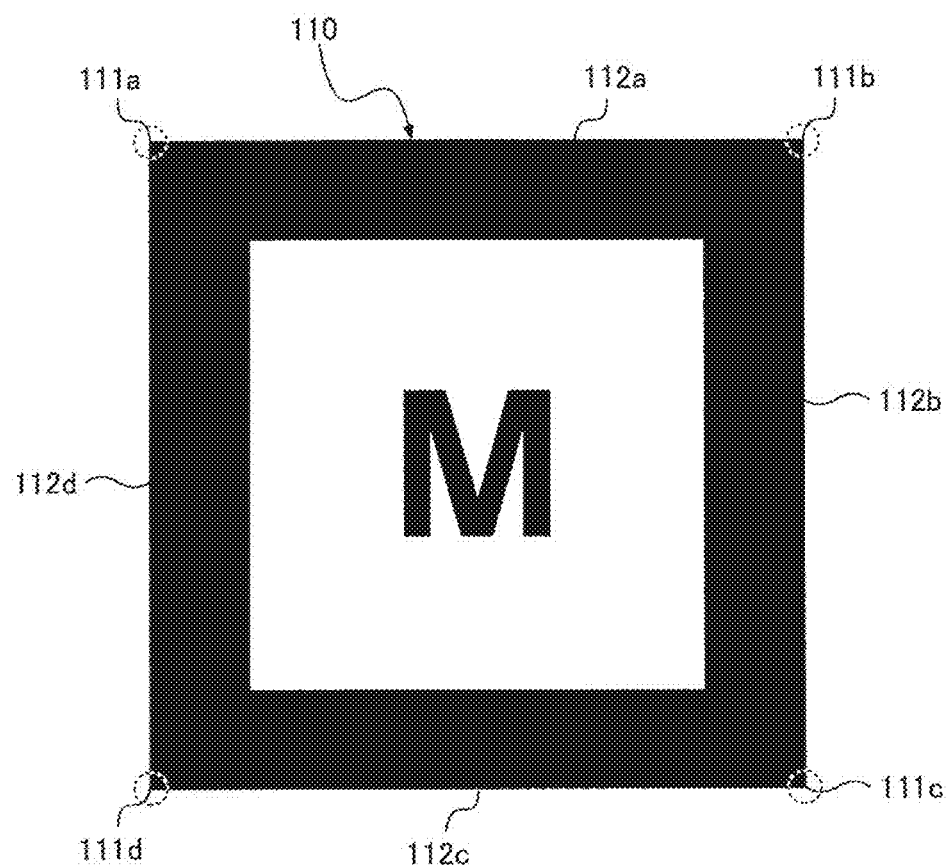
FIG. 2 is a diagram showing an example of a configuration for a marker, in accordance with embodiments of the present invention.

FIG. 2 is a diagram showing an example of a configuration for a marker 110, in accordance with embodiments of the present invention. In FIG. 2, the marker 110 has a square frame and a letter inside the frame (the letter "M" in this example). In the example shown in FIG. 2, the geometric elements are the vertices 111a-111d at the four corners and the line segments 112a-112d on the four sides of the square frame. In other words, the image can be identified as a marker 110 by recognizing the four vertices 111a-111d and line segments 112a-112d. The technique used to extract geometric elements from an image and identify a marker 110 can be any existing type of image analysis.

The letter "M" inside the square frame is the symbolic element in the marker 110. In other words, the type of marker 110 can be identified by reading the letter "M". The technique used to extract the symbolic element from an image and read the element can be any existing type of image analysis.

Figure 3:
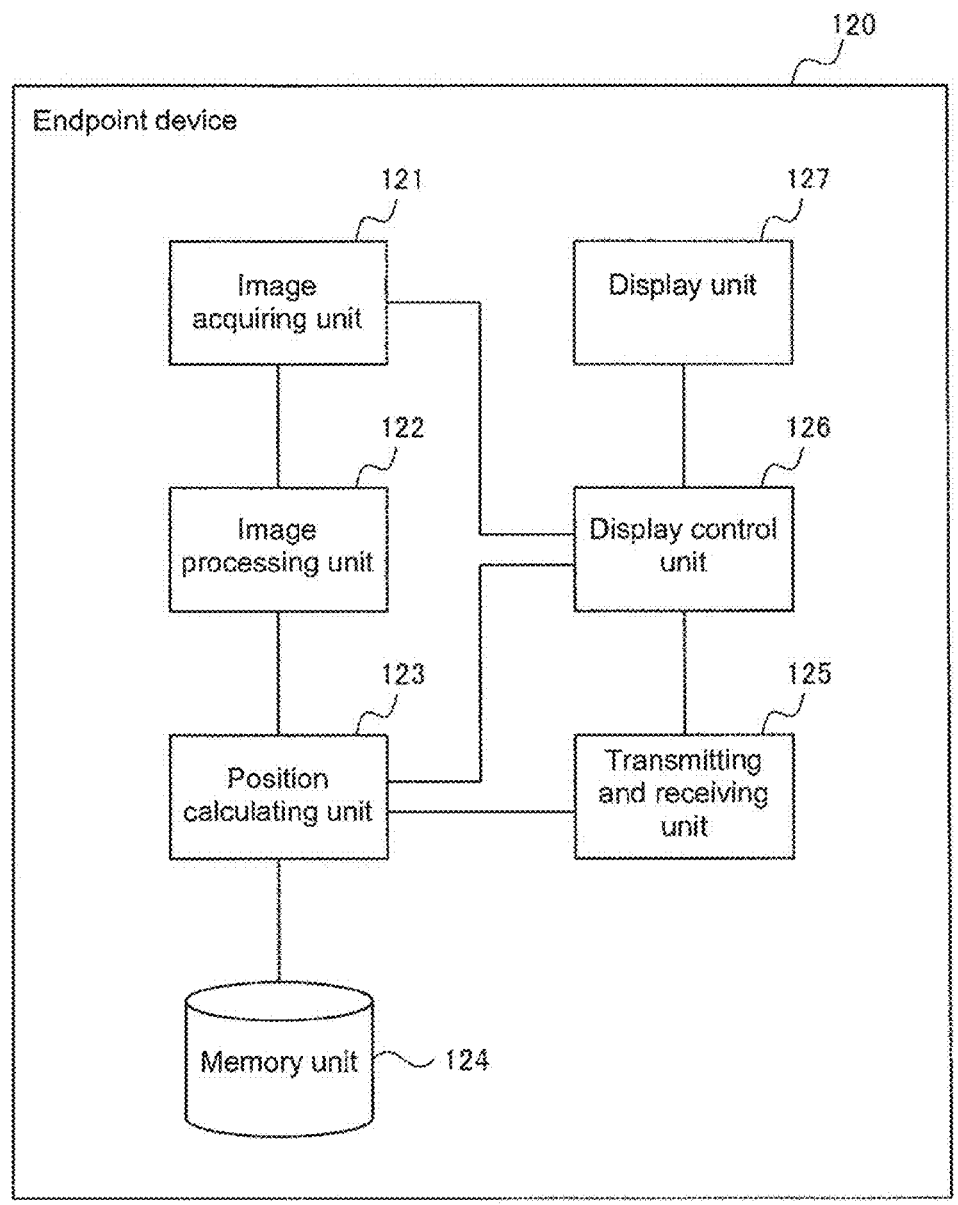
FIG. 3 is a schematic showing the function configuration of an endpoint device, in accordance with embodiments of the present invention.

FIG. 3 is a schematic showing the function configuration of an endpoint device 120, in accordance with embodiments of the present invention. The endpoint device 120 is a hardware device that includes an imaging means (camera function) for acquiring an image of a marker 110, and can be realized by a mobile information endpoint device such as a tablet endpoint device, a mobile phone, or a notebook PC (personal computer). The endpoint device 120 shown in FIG. 3 includes an image acquiring unit 121, an image processing unit 122, a position calculating unit 123, a memory unit 124, a transmitting and receiving unit 125, a display control unit 126, and a display unit 127.

The image acquiring unit 121 can be realized by a camera used to acquire an image of the marker 110. During actual operation, an image is taken of a location including a marker 110 (an image including the marker 110). The means of realizing the image acquiring unit 121 can be the camera function of a mobile phone serving as the endpoint device 120.

The image processing unit 122 analyzes an image acquired by the image acquiring unit 121. The image of the marker 110 is extracted from the image acquired by the image acquiring unit 121 in this way. More specifically, the image processing unit 122 extracts the portions (areas) at locations corresponding to geometric elements of the marker 110 from the image acquired by the image acquiring unit 121, and use these as an image of the marker 110. In an image of the marker 110 shown in FIG. 2, image elements corresponding to the geometric elements, that is, the vertices 111a-111d and line segments 112a-112d, are detected, and the portions (areas) of the image including these are extracted as the marker 110. Detection of the geometric elements can be performed using any existing type of image analysis.

The image processing unit 122 also detects the symbolic elements of the marker 110 in the extracted image of the marker 110. Because the symbolic elements provided in the marker 110 indicate the type of marker 110 on the basis of pre-existing positions and shapes, the marker 110 can be detected by identifying the corresponding symbolic elements in a pre-established database of symbolic elements. The extracted image of the marker 110 may be distorted relative to the actual shape of the marker 110 as described in greater detail below, but the distortion can be corrected for and the right symbolic elements identified with a high degree of accuracy using any existing type of image analysis.

The image of the marker 110 can be extracted from the image acquired by the image acquiring unit 121, and the symbolic elements of a marker 110 corresponding to the extracted image detected in order to identify the acquired marker 110. In other words, the image processing unit 122 functions as a marker identifying means. When there is more than one marker 110 in a relatively narrow range, a plurality of markers 110 may be included in the same image captured by the image acquiring unit 121. In this case, the image captured by the image acquiring unit 121 can be analyzed, and multiple markers 110 identified. In the system explained in the present embodiment, a single marker 110 may be selected and identified, for example, by taking the largest possible size image of the marker 110.

In the initial operation for using a service provided by the information presenting system 100 in the present embodiment, information on the geometric elements and symbolic elements of the marker 110 may be accessed by a central server 130 (See FIG. 6) external to the endpoint device 120 and received from the central server 130. Also, a site may be established for registering information on the geometric elements and symbolic elements of markers 110 on a network such as the Internet so that information on the geometric elements and symbolic elements of markers 110 used by the information presenting system 100 of the present embodiment to provide a service can be acquired beforehand.

The position calculating unit 123 calculates the relative positional relationship between a marker 110 and an endpoint device 120 by analyzing an image of the marker extracted by the image processing unit 122. The image of the marker 110 extracted by the image processing unit 122 is usually distorted due to the relative positional relationship between the marker 110 and the endpoint device 120, and may be different from the actual shape and size of the marker 110. Therefore, the position calculating unit 123 calculates the distance between the marker 110 and the endpoint device 120, the orientation of the marker 110 relative to the endpoint device 120, and the orientation of the endpoint device 120 relative to the marker 110 based on differences between a reference shape and size of the actual marker 110 (which is a true size and shape of the marker 110) and a size and shape of the marker 110 determined from analysis of the extracted image of the marker 110. The position calculating unit 123 can recognize the actual shape and size of the marker 110 based on the geometric element information mentioned above and definition information explained below in greater detail.

Figure 4:
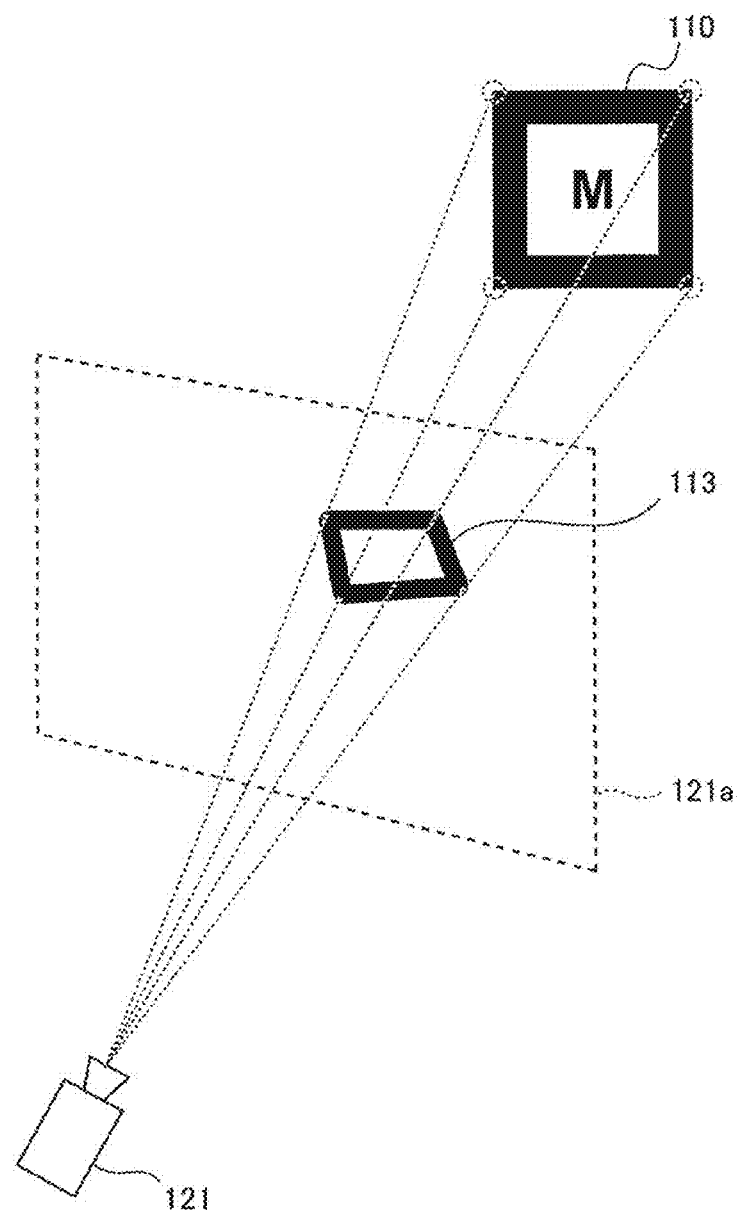
FIG. 4 is a diagram showing how the image of the marker is distorted in an image taken by the image acquiring unit in the endpoint device, in accordance with embodiments of the present invention.

FIG. 4 is a diagram showing how the image of a marker 110 is distorted in an image taken by the image acquiring unit 121 in the endpoint device 120, in accordance with embodiments of the present invention. Here, the marker 110 is the two-dimensional image shown in FIG. 2. FIG. 4 also shows a virtual plane 121a corresponding to the imaging plane of the image acquiring unit 121. In other words, the plane 121a shown in FIG. 4 represents the image containing the marker 110 which was taken by the image acquiring unit 121. When an image containing the marker 110 is taken by the image acquiring unit 121, the image 113 of the marker 110 in the image (plane 121a) acquired by the image acquiring unit 121 is distorted unless the marker 110 is right in front of the image acquiring unit 121 and the marker 110 itself is squarely facing the image acquiring unit 121. Therefore, the distortion in the image 113 has to be corrected to identify the marker 110. The technique used to correct the image 113 acquired by the image acquiring unit 121 and recognize the marker 110 can be any existing technique used in AR technology.

Figure 5A:
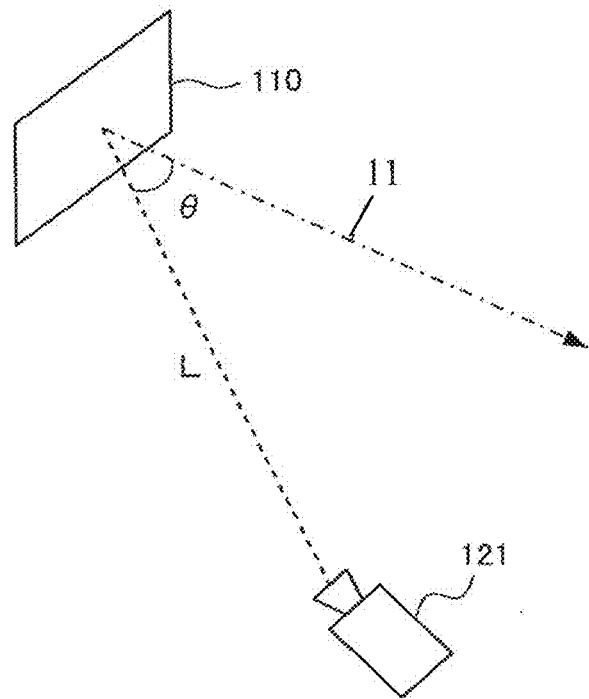
FIGS. 5(a) and 5(b) depict the relative position of the marker and the endpoint device relative to each other, in accordance with embodiments of the present invention.
Figure 5B:
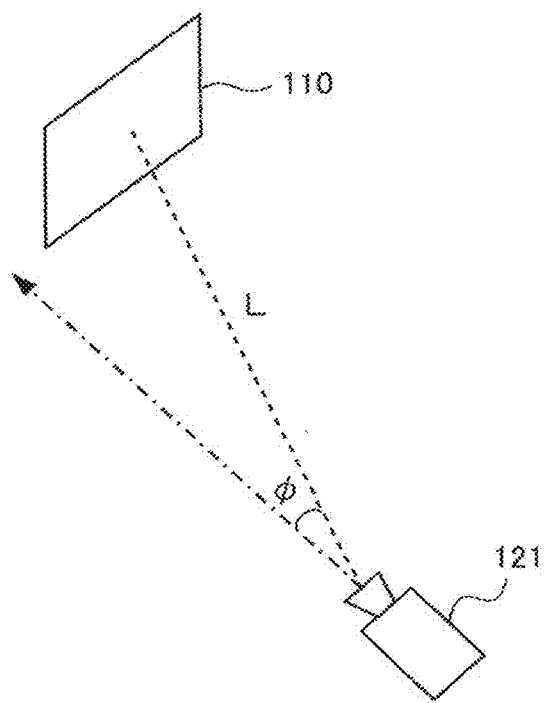

FIGS. 5(a) and 5(b) depict diagrams used to explain the relative position of the 110 marker and the endpoint device 120 relative to each other, in accordance with embodiments of the present invention. FIG. 5(a) is a diagram showing the orientation of the marker 110 relative to the endpoint device 120, and FIG. 5(b) is a diagram showing the orientation of the endpoint device 120 relative to the marker 110. In the example shown in FIGS. (a) and 5(b), the distance between the marker 110 and the endpoint device 120 is L.

As shown in FIG. 5(a), the orientation of the marker 110 relative to the endpoint device 120 is represented by angle θ formed by a uniquely determined reference direction 11 based on the shape and orientation of the marker 110 (indicated by the long and short dashed line in FIG. 5(a)) and the direction of the endpoint device 120 as viewed from the marker 110 (indicated by the uniformly dashed line in FIG. 5(a)). When the marker 110 is a two-dimensional image, the reference direction can be the normal line direction that is normal to the plane of the marker 110.

As shown in FIG. 5(b), the orientation of the endpoint device 120 relative to the marker 110 is represented by angle φ formed by the optical axis direction of the image acquiring unit 121 of the endpoint device 120 (indicated by the long and short dashed line in FIG. 5(b)) and the direction of the marker 110 as viewed from the endpoint device 120 (indicated by the uniformly dashed line in FIG. 5(b)).

The technique used to calculate the relative positional relationship between the marker 110 and the endpoint device 120, including the values for distance L and angles θ and φ, on the basis of the image acquired by the image acquiring unit 121 can be any technique commonly used in AR technology.

The memory unit 124 in the endpoint device 120 stores the information on the geometric elements and symbolic elements of the marker 110 and definition information used to identify markers 110. The memory unit 124 also stores related information on markers 110 related to each other, and additional information for each marker 110 displayed on the display unit 127. Examples of definition information include the shapes, sizes, positions, and arrangement of markers 110. In the additional information, the position information is used to identify the position of a marker 110 such as localized position information on the basis of the longitude and latitude, the height from the floor, the height from the ground, the structure on which the marker 110 is arranged, the site, etc. The localized position information can be building-identifying information, floor-identifying information, and site-defining information. Information on the arrangement of markers in the definition information includes the orientation and inclination of a marker 110. This definition information may be acquired from the central server 130 and stored in the memory unit 124. Related information and additional information will be described in greater detail below.

The position calculating unit 123 calculates the positional relationship between a marker 110 and an endpoint device 120 on the basis of the shape and size of the marker 110 obtained from geometric element information and definition information stored in the memory unit 124 and the image in the marker 110 extracted from the image processing unit 122. For example, when position information for a marker 110 includes its longitude and latitude, the longitude and latitude of the endpoint device 120 are calculated based on the geometric element information and definition information. When the position information for a marker 110 includes the height from the floor or the height from the ground, the height of the endpoint device 120 from the floor or the ground is calculated based on the geometric element information and definition information. When the localized position information in the position information of the marker 110 is building- or site-based, the position of the endpoint device 120 in the building or site is calculated based on the geometric element information and definition information. When a plurality of images of markers 110 has been extracted by the image processing unit 122, the position calculating unit 123 calculates the positional relationship between the terminal 120 and each marker 110 on the basis of each image.

The transmitting and receiving unit 125 calculates the positional relationship between each marker 110 and the endpoint device 120. The transmitting and receiving unit 125 is a network interface for connecting to the central server 130 via a network 200. Requests for definition information, addition information, and related information on markers 110, and information on markers 110 identified by the image processing unit 122 are sent by the transmitting and receiving unit 125 to the central server 130. The definition information, addition information, and related information on markers 110 required by the endpoint device 120 are sent in the reply from the central server 130 and received by the transmitting and receiving unit 125.

The display control unit 126 displays images acquired by the image acquiring unit 121 to the display unit 127. The display control unit 126 also generates information presenting images including additional information on markers 110 sent from the central server 130, and displays the generated information presenting images on the display unit 127. An information presenting image is used to present additional information added to a marker 110 to the user of the endpoint device 120. For example, an object (an information display using images and text as display elements) is added and generated on the image acquired by the image acquiring unit 121 based on additional information on markers 110 sent from the central server 130. Information presenting images with this configuration also include objects based on additional information on other markers 110 related to the marker 110 identified by the image processing unit 122 on the objects displayed on the information presenting image. In the present embodiment, objects displayed on the information presenting image can be selected and the display format of the objects controlled on the basis of predetermined rules. Controls performed by the display control unit 126 are explained in greater detail below.

The display unit 127 can be realized, for example, using a liquid crystal display, and the displayed images are controlled by the display control unit 126.

Although not shown, the endpoint device 120 has an input device allowing the operator to perform input operations. Examples of input devices include a touch panel placed over the screen of the display unit 127 to detect and accept touch operations performed by the operator at input operations, a pointing device such as a mouse or track ball, or a keyboard.

Figure 6:
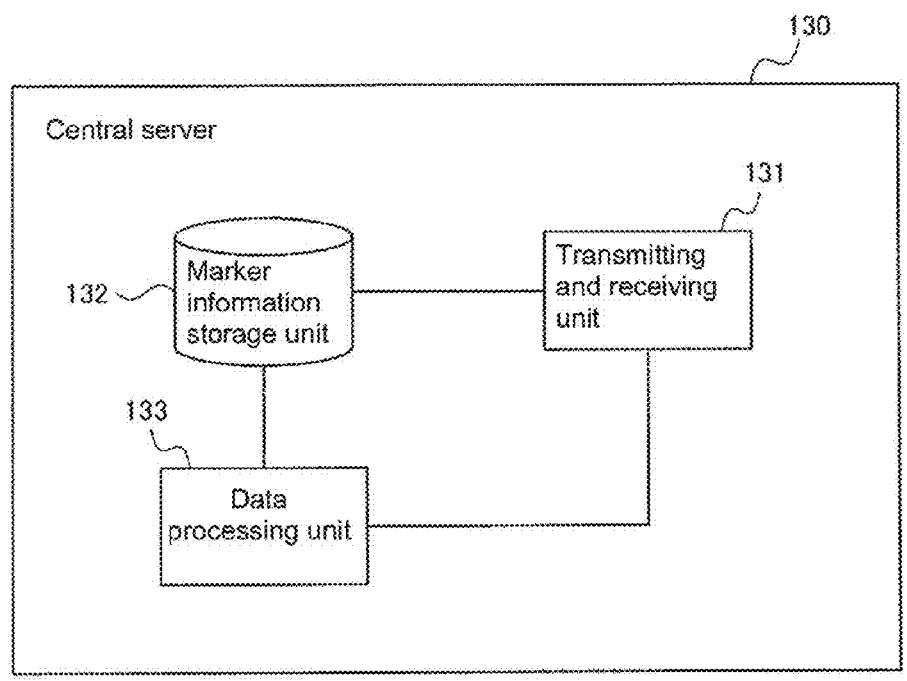
FIG. 6 is a diagram showing a configuration of a central server, in accordance with embodiments of the present invention.

FIG. 6 is a diagram showing the function configuration of a central server 130, in accordance with embodiments of the present invention. The central server 130 is a server computer used to manage information on markers 110. The central server 130 in FIG. 6 includes a transmitting and receiving unit 131, a marker information storage unit 132, and a data processing unit 133.

The transmitting and receiving unit 131 receives information identifying a marker 110 and information on the positional relationship between the endpoint device 120 and the designated marker 110 from the endpoint device 120. It returns to the endpoint device 120 additional information on the marker 110 obtained by the processing described below, and additional information on other markers 110 relayed to the marker 110.

The marker information storage unit 132 is a database for storing definition information and additional information for each marker 110 managed by the information presenting system 100 in the present embodiment, and related information between markers 110. As mentioned above, definition information is used to identify markers 110. More specifically, it can be information on the shape, size, position, and arrangement of markers 110.

Additional information is information displayed as an object in an information presenting image displayed on the endpoint device 120, and is information associated with and added to the location of a marker 110. The specific content of additional information in the present embodiment is determined based on the purpose or mode of embodiment for the information presenting system 100. The additional information may be the name and attributes of the location or facility including the marker 110, the name and attributes of products arranged in the location including the marker 110, or information on the staff or manager responsible for the location, facility or product. Depending on the purpose, the additional information may be the type, price and number of products in stock at the location including the marker 110. The additional information may also be information indicating the importance of the information as explained in greater detail below.

Related information is information indicating the relationship between each marker 110. More specifically, related information for each marker 110 includes information identifying other markers 110 associated with the marker 110, and information indicating the type of relationship between the marker 110 and other markers 110. In the present embodiment, the markers 110 are classified by group, a hierarchical relationship is established between groups, and the relationship between markers 110 is established for each marker 110 (related information).

By exchanging data with an endpoint device 120, the data processing unit 133 retrieves the information related to a marker 110 that is stored in the marker information storage unit 132, and sends the information to the endpoint device 120. More specifically, when a request for definition information is received from an endpoint device 120, definition information for each marker 110 to be managed is sent to the endpoint device 120 in reply. When information identifying a single marker 110 is received from an endpoint device 120, additional information and related information on the designated marker 110 is sent to the endpoint device 120 in reply.

In the present embodiment, as mentioned above, the information indicating the marker 110 acquired from an image by the image processing unit 121 is sent from an endpoint device 120 to the central server 130, and the central server 130 searches for other markers 110 associated with the marker 110 identified by the endpoint device 120. Additional information on the marker 110 identified by the endpoint device 120 and additional information retrieved on the other markers 110 is sent from the central server 130 to the endpoint device 120. The marker 110 designated by the endpoint device 120 is referred to as the designated marker 110a below. Also, markers 110 associated with the designated marker 110a and retrieved by the central server 130 are referred to as related markers 110b.

Here, the positional relationship between the designated marker 110a and the endpoint device 120 is determined by the position calculating unit 123. Related markers 110b are identified on the basis of additional information on each marker 110 and related information sent to the endpoint device 120 from the central server 130, and the positional relationship between related markers 110b and the endpoint device 120 is determined by the position calculating unit 123. Therefore, the positions of the designated marker 110a and the related marker 110b in the space in which they are arranged is determined on the basis of this information.

Figure 7A:
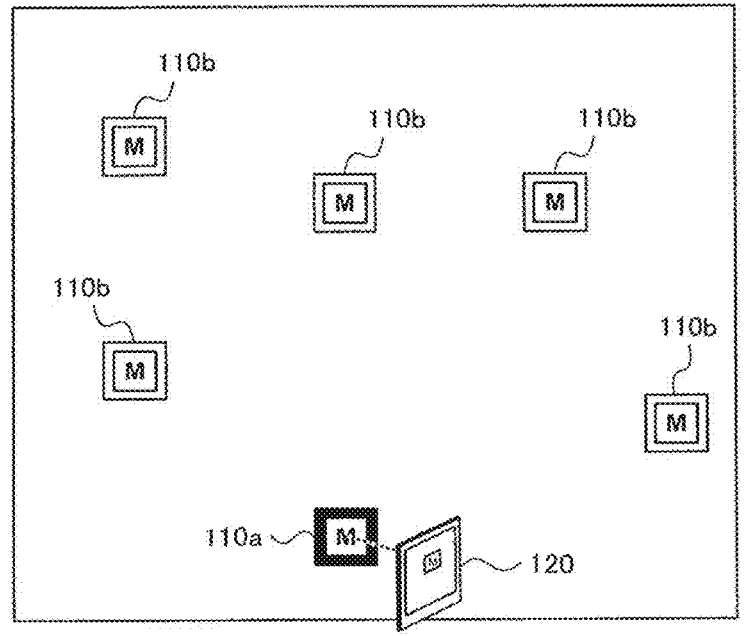
FIGS. 7(a) and 7(b) show the relationship between the endpoint device and a plurality of markers, in accordance with embodiments of the present invention.
Figure 7B:
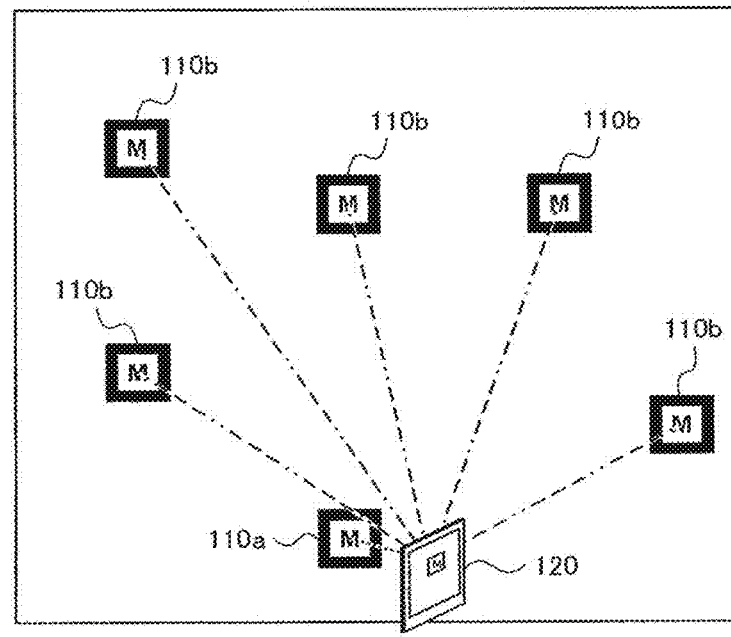

FIGS. 7(a) and 7(b) show the relationship between the endpoint device 120 and a plurality of markers 110, in accordance with embodiments of the present invention. FIG. 7(a) is a diagram showing the relationship between the endpoint device 120 and the designated marker 110a, and FIG. (b) is a diagram showing the relationship between the endpoint device 120, the designated marker 110a, and related markers 110b. Here, as shown in FIG. 7(a), the operator of the endpoint device 120 acquires an image of one of these markers 110 using the image acquiring unit 121 in the endpoint device 120. The marker 110 acquired in the image is the designated marker 110a. The positional relationship between the endpoint device 120 and the designated marker 110a is determined by the position calculating unit 123 in the endpoint device 120. The endpoint device 120 sends information on the designated marker 110a to the central server 130, and acquires related information on related markers 110b related to the designated marker 110a from the central server 130. Because the related markers 110b to the designated marker 110a are identified on the basis of this related information, the positional relationship between the endpoint device 120 and the related markers 110b can be identified as shown in FIG. 7(b) using the position information in the definition information of the identified related markers 110b. As a result, the endpoint device 120 recognizes the positions of the designated marker 110a and the related markers 110b in the space shown in FIG. 7(a) and FIG. 7(b).

The following is an explanation of the relationship between each marker 110 managed by the related information stored in the marker information storage unit 132 of the central server 130. In the present embodiment, the markers 110 are classified into groups for management purposes. The markers 110 belonging to the same group are markers 110 that are associated with each other. In other words, when a marker 110 belonging to a given group is the designated marker 110a, the other markers 110 belonging to the same group are related markers 110b. The configuration of the groups can be a simple configuration in which one or more markers 110 belong to one or more groups, or a configuration in which there is an order or hierarchical structure between groups and markers 110 belonging to groups.

Figure 8:
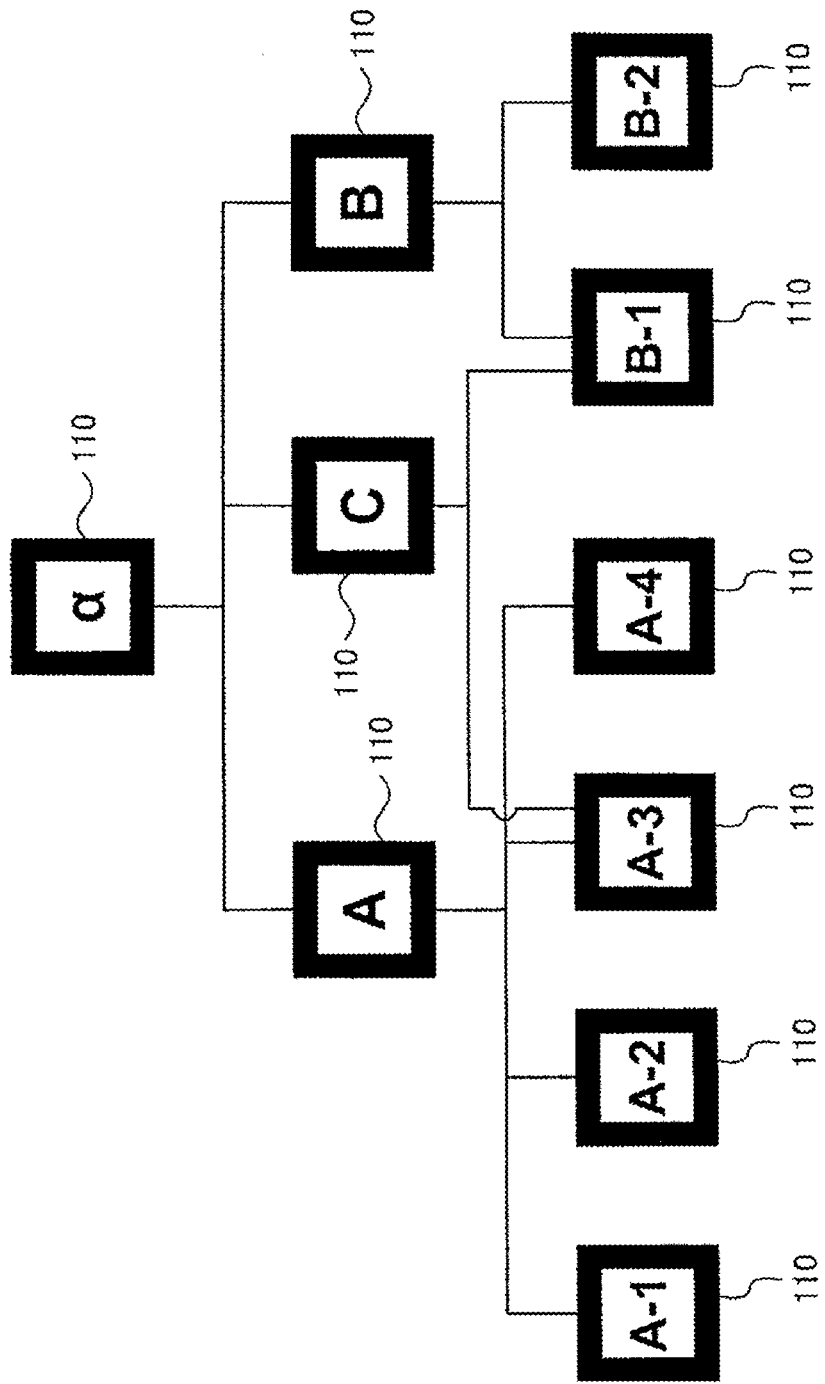
FIG. 8 is a diagram showing an example of the relationships among markers of a plurality of markers, in accordance with embodiments of the present invention.

FIG. 8 is a diagram showing an example of the relationship between a plurality of markers 110, in accordance with embodiments of the present invention. In the example shown in FIG. 8, each marker 110 has a letter or alphanumeric combination "α", "A", "A-1" through "A-4", "B", "B-1" through "B-2", and "C" serving as a symbolic element for identifying individual markers 110. In the example shown in FIG. 8, marker "A-1" through marker "A-4" are in Group A whose parent is marker "A", and marker "B-1" through marker "B-2" are in Group B whose parent is marker "B". Here, marker "A-3" belonging to Group A and marker "B-1" belonging to Group B also belong to another parent group (Group C) for "C" markers. All markers belonging to Group A through Group C belong to Group α whose parent is marker "α".

When related information indicating the relationships in FIG. 8 is stored in the marker information storage unit 132 and a given marker 110 is the designated marker 110a, the related information can be referenced to retrieve related markers 110b for the designated marker 110a. For example, when marker "A-1" is the designated marker 110a, markers "A-2", "A-3" and "A-4" belonging to the same group (Group A) as marker "A-1" are related markers 110b in Group A whose parent is marker "A".

Similarly, when marker "A-3" is the designated marker 110a, markers "A-1", "A-2" and "A-4" belonging to the same group (Group A) as marker "A-3" are related markers 110b in Group A whose parent is marker "A". Because marker "A-3" also belongs to Group C, marker "B-1" belonging to Group C is also a related marker 110b in Group C whose parent is marker "C".

When marker "A", which is the parent of Group A, is the designated marker 110a, all of the markers "A-1" through "A-4" belonging to Group A and marker "α", which is the parent of Group a to which Group A belongs, are related markers 110b. When marker "α", which is the parent of Group α, is the designated marker 110a, all markers belonging to Group a are related markers 110b. When a marker 110 that is not the parent of any group is the designated marker 110a, a marker 110 which is the parent of a higher group to which the marker 110 belongs can be included among the related markers 110b. (For example, when marker "A-1" in Group A is the designated marker 110a, marker "α" can be a related marker 110b.)

The group configuration for markers 110 shown in FIG. 8 is for illustrative purposes only, and the relationships between markers 110 are not restricted to the group configuration shown in the drawing. In the present embodiment, markers 110 can be classified and managed in various types of groups. Individual markers 110 may belong to only one group, or may belong to multiple groups like marker "A-3" and marker "B-1" in FIG. 8. As mentioned above, even the configuration of each group can assume different forms. When an individual marker 110 has been designated as the designated marker 110a, markers 110 within a given range of the group to which the designated marker belongs can be selected as related markers 110b according to various rules. In the information presenting system 100 in the present embodiment, the specific group configuration for the markers 110 and ranges for related markers 110b can be established based on a variety of factors such as the specific specifications, configuration, purpose, and scale of the embodied information presenting system.

The following is an explanation of the object display controls performed by the display control unit 126 of the endpoint device 120. As mentioned above, the endpoint device 120 sends information on the marker 110 identified by the image processing unit 122 to the central server 130. Additional information on the marker 110, and additional information and related information on related markers 110b retrieved for the marker 110 serving as the designated marker 110a are then acquired from the central server 130 (the marker 110 identified by the image processing unit 122 is referred to below as the designated marker 110a). The display control unit 126 generates an information presenting image with an object added on the basis of additional information on each marker 110 to the image acquired by the image acquiring unit 121 using the additional information on the designated marker 110a and the additional information and related information on the related markers 110b, and the resulting information presenting image is displayed on the display unit 127.

As explained above with reference to FIG. 7, the endpoint device 120 can recognize the position of the endpoint device 120 in the space including the designated marker 110a and related markers 110b. In this way, the endpoint device 120 can determine the positions of related markers 110b from the position of the endpoint device 120. Therefore, even when the orientation of the endpoint device 120 changes and the imaging range of the image acquiring unit 121 changes, objects related to the designated marker 110a and related markers 110b in the changed imaging range are displayed in the information presenting image.

Here, the endpoint device 120 acquires an image of the designated marker 110a using the image acquiring unit 121, and analyzes the acquired image of the designated marker 110a to determine the positional relationship between the designated marker 110a and the endpoint device 120, and to determine the positional relationship between the related markers 110b and the endpoint device 120. Therefore, when the information acquiring unit 121 of the endpoint device 120 captures the designated marker 110a (the designated marker 110a in the imaging range of the image acquiring unit 121), the position of the endpoint device 120 relative to the designated marker 110a and related markers 110b can be determined, and objects for these markers 110 displayed in the information presenting image.

However, when each marker 110 is arranged in a limited space such as the premises of a building, the position of the endpoint device 120 in the space can be determined on the basis of the positional relationship between the endpoint device 120 and the designated marker 110a. The position of each related marker 110b in the space can also be determined on the basis of the positions of the designated marker 110a and the endpoint device 120 in the space. Here, the position of each marker 110 in the space can be indicated on a map of the premises representing the space in which the markers 110 are arranged. In this case, the map of the premises representing the space in which the markers 110 are arranged can be displayed on the display unit 127 even when the position of the endpoint device 120 relative to each marker 110 changes and even when the designated marker 110a is no longer in the imaging range of the image acquiring unit 121, and the user of the endpoint device 120 can locate each marker 110 using the position of the marker 110 on the map.

After the endpoint device 120 has identified the positions of the designated marker 110a and related markers 110b, and the position and orientation of the endpoint device 120 has changed to exclude the designated marker 110a from the imaging range of the image acquiring unit 121, the position of the endpoint device 120 relative to the designated marker 110a and the related markers 110b can no longer be determined by the endpoint device 120. Therefore, in principle, endpoint device 120 can no longer display objects for each marker 110 on the display unit 127. However, once the endpoint device 120 has acquired additional information and related information for each marker 110, the information can be held in the memory unit 124 of the endpoint device 120. Therefore, the image of any related marker 110b can be acquired by the image acquiring unit 121. If one of the related markers 110b is established as the new designated marker 110a, the endpoint device 120 can immediately determine the positional relationship between the new designated marker 110a, related markers 110b, and the endpoint device 120 on the basis of information stored in the memory unit 124 and without having to acquire additional information and related information on each marker 110 from the central server 130 again. For example, when the operator of the endpoint device 120 wishes to get information related on a certain related marker 110b (location in the facility, etc.), an object for the related marker 110b can be continuously displayed on the display unit 127 by capturing the appropriate related marker 110b (a related marker 110b other than the related marker 110b in question) and establishing this as the new designated marker 110a) when the original designated marker 110a is no longer within the imaging range of the image acquiring unit 121.

Because the positions of the designated marker 110a and related markers 110b viewable from the endpoint device 120 have been determined, an object related to a marker 110 can be displayed at the location of the marker 110 even when the marker 110 is not visible at the location of the endpoint device (that is, even when an image of the marker 110 itself cannot be captured by the camera function of the device). An object can be displayed in the information display image on the basis of the degree-of-importance conditions explained below even when the marker 110 is at a location outside of the imaging range of the image acquiring unit 121.

Here, when the display control unit 126 generates an information presenting image, the way in which objects are displayed in the information presenting image can be controlled on the basis of the status and type of marker 110 corresponding to the displayed object. For example, the object for the designated marker 110a can be displayed differently than objects for related markers 110b. The objects for markers 110 outside of the imaging range of the image acquiring unit 121 may also be displayed differently from objects for markers 110 within the imaging range of the image acquiring unit 121.

Figure 9:
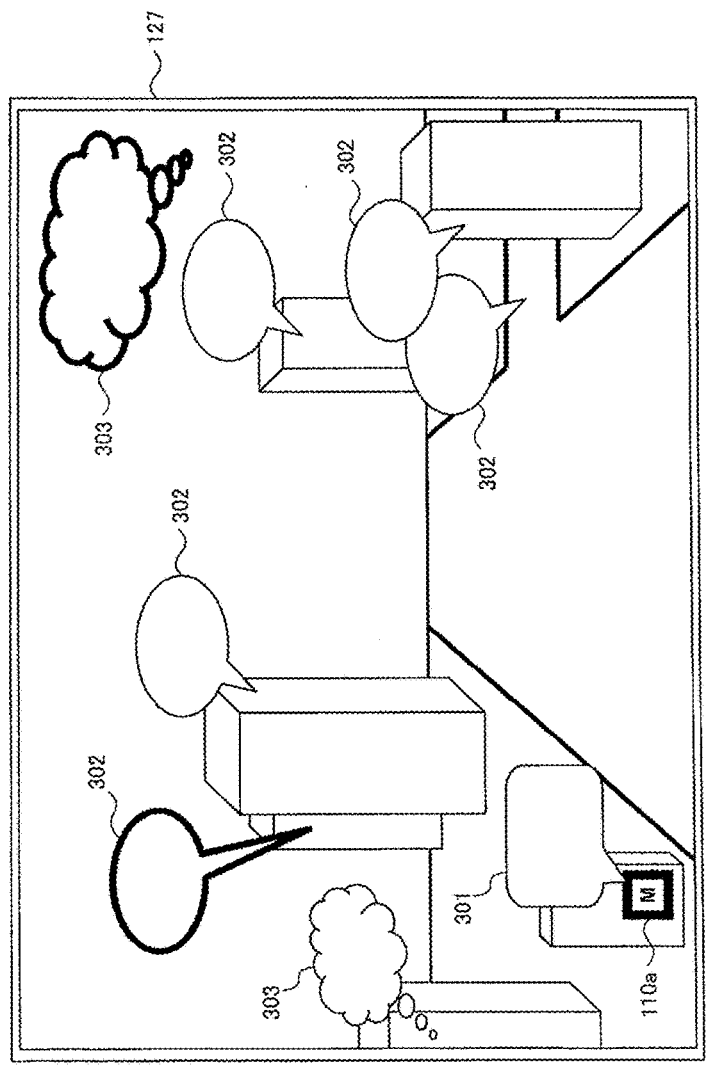
FIG. 9 is a diagram showing an example of an information presenting image displayed on the display unit of the endpoint device, in accordance with embodiments of the present invention.

FIG. 9 is a diagram showing an example of an information presenting image displayed on the display unit 127 of the endpoint device 120, in accordance with embodiments of the present invention. In the example shown in FIG. 9, the information presenting image displayed on the display unit 127 is a synthesis of an image acquired by the image acquiring unit 121 of the endpoint device 120, an object for the designated marker 110a in the imaging range, and objects for related markers 110b related to the designated marker 110a. In the example shown in FIG. 9, object 301 appears as a rectangular speech bubble which indicates additional information on the designated marker 110a. Object 302 appears as a rounded speech bubble which indicates additional information on a related marker 110b. Object 303 appears as a thought bubble in the information presenting image which indicates additional information on a marker 110 outside of the imaging range of the image acquiring unit 121 (behind the user or on another floor). Although not shown, the speech or thought bubble of each object 301, 302, 303 displays additional information on the marker 110 corresponding to each object 301, 302, 303.

In the example shown in FIG. 9, the two objects 302, 303 rendered using thick lines indicate objects including additional information with a high degree of importance. Object 303 rendered using thick lines is displayed in the information presenting image even though the marker 110 is outside of the imaging range of the image acquiring unit 121 because of its high degree of importance.

The following is an example of the display priority for objects. When there are multiple markers 110 in the imaging range of the image acquiring unit 121 and an object is displayed for all of the markers 110, the information presenting image may become crowded and the information may become difficult to use. When several objects overlap because of the positions of the markers 110, objects can also be difficult to view. Therefore, in the present embodiment, a display priority has been established for each object to be displayed.

FIG. 10 is a table showing an example of display priority settings for objects, in accordance with embodiments of the present invention. In the example shown in FIG. 10, there are four values used to determine the display priority for five markers 110, the designated marker and related markers A-D. These are the distance to the endpoint device, the orientation of the marker relative to the endpoint device, degree of importance, and a display order specifying value.

The "distance to endpoint device" column is used to register the distance between the endpoint device 120 and the designated marker, and the distance between the endpoint device 120 and each related marker A-D as calculated by the position calculating unit 123 of the endpoint device 120. In the example shown in FIG. 10, there is no unit of distance. This depends on the specific purpose, configuration and scale used in the embodiment of the information presenting system 100. The distance between the endpoint device 120 and each related marker A-D can be established using relative unit lengths based on the unit length for the distance from the endpoint device 120 and the designated marker (value "1").

The "orientation relative to endpoint device" column is used to register the angle of the direction extending from the endpoint device 120 to each marker 110 relative to the imaging direction (optical axis direction) of the image acquiring unit 121 of the endpoint device 120. When the angle relative to the imaging direction is smaller, the marker 110 is closer to the front of the image acquiring unit 121. This is used to calculate the display priority when taking into account the likelihood of the user of the endpoint device 120 targeting the marker with the image acquiring unit 121.

The "degree of importance" column is used to register a degree-of-importance value established based on the additional information of each marker 110. These degree-of-importance values may be established based on the location of the marker 110 or the status of the product arranged at the location. Examples of values include "critical", "urgent" and "normal". These degree-of-importance values may change dynamically based on any change in location or product status. Here, the central server 130 may acquire information related to the location of a marker 110 or product status from the management system used in the embodiment of the information presenting system 100. The degree of importance of each marker 110 can be changed when there is a change in status.

The "display order specifying value" is calculated using as parameters the values for the distance from the endpoint device, the orientation relative to the endpoint device, and the degree of importance, and indicate the priority for displaying the objects for each marker 110 in an information presenting image. The method used to calculate the display order specifying value can be any method commonly used to determine display priority. In the example shown in FIG. 10, the display order specifying value is calculated using the formula: $s = x + 10y + z$, where x is the value for the distance to the endpoint device, y is the value for the orientation of the marker relative to the endpoint device, z is the value for degree of importance, and s is the display order specifying value.

The endpoint device 120 determines the display order for the objects of each marker 110 on the basis of the display order specifying values calculated in the manner mentioned above. In the example of settings shown in FIG. 10, objects are displayed in ascending order from the object with the smallest display order specifying value. When more than one object overlap in the information presenting image, the object with the smaller display order specifying value is given priority (displayed on top).

A threshold value may be set for the display order specifying values so that only objects for markers 110 having a display order specifying value less than the threshold value are displayed in an information presenting image. For example, in the example of settings shown in FIG. 10, when the threshold value is set at "27", the objects for three markers are displayed on the information presenting image: the designated marker with a display order specifying value of "13", related marker C with a display order specifying value of "16", and related marker D with a display order specifying value of "26". In the case of objects excluded from display due to the threshold value, operations may be received to indicate the objects not being displayed in the information presenting image, and display some of these objects.

Another threshold value may be set to display in the information presenting image objects for markers 110 outside of the imaging range of the image acquiring unit 121. For example, objects for markers 110 with a display order specifying value less than the threshold value may be displayed in the information presenting image even when the markers 110 are outside of the imaging range of the image acquiring unit 121. The threshold value for displaying objects for markers 110 outside of the imaging range of the image acquiring unit 121 can be established using the degree-of-importance value rather than the display order specifying value in order to prioritize the additional information on the markers 110.

Figure 11:
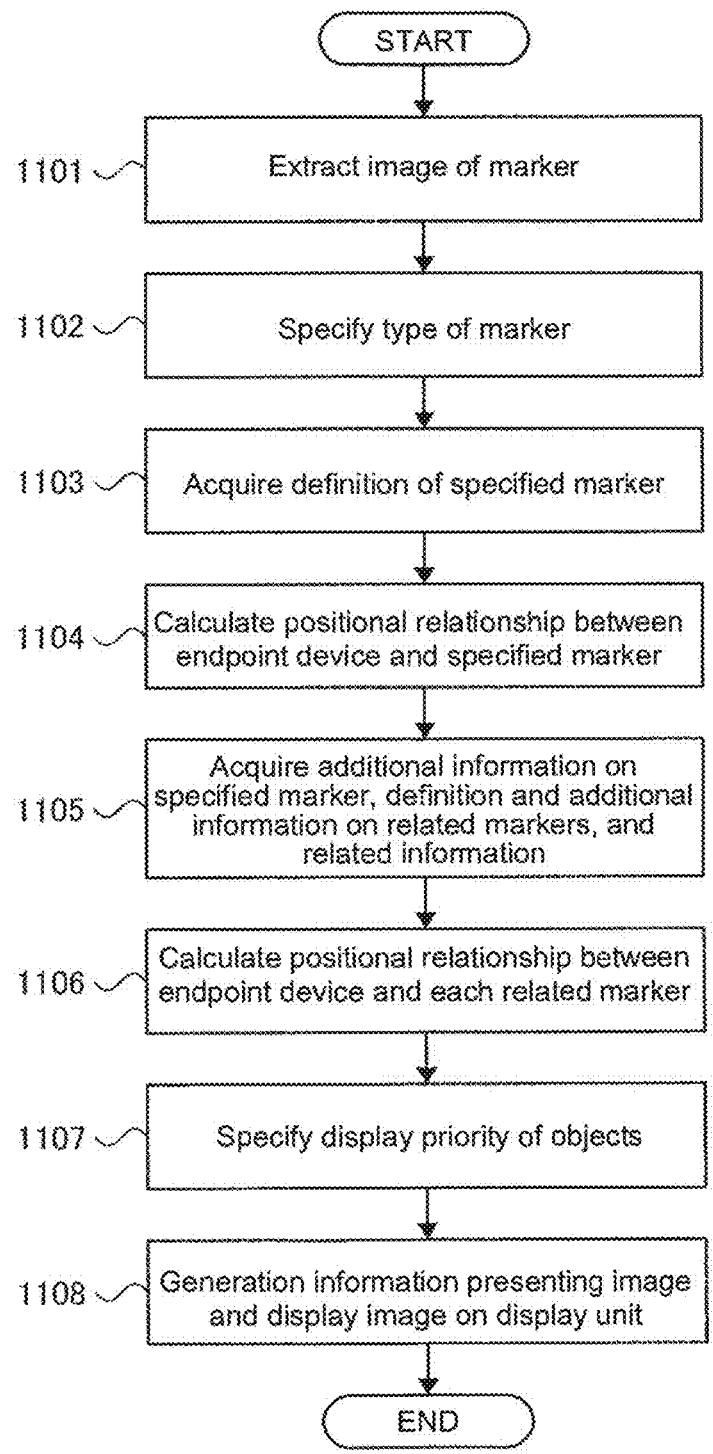
FIG. 11 is a flowchart of the operations performed by the endpoint device, in accordance with embodiments of the present invention.

FIG. 11 is a flowchart of the operations performed by the endpoint device 120, in accordance with embodiments of the present invention. In these operations, information on the geometric elements and symbolic elements of the markers 110 has been acquired by and stored in the endpoint device 120 beforehand. As shown in FIG. 11, the operator of the endpoint device 120 first selects or designates an appropriate marker 110, and captures (i.e., acquires) an image comprising the selected or designated marker 110 in the imaging range of the image acquiring unit 121 of the endpoint device 120. Then, the image processing unit 122 analyzes the image including the marker 110 captured by the image acquiring unit 121 to extract an image of the marker 110 (Step 1101). Then, the image processing unit 122 identifies the type of marker 110 on the basis of the symbolic elements in the extracted image of the marker 110 (Step 1102). Thus, identifying the type of the designated marker 110 comprises: identifying a symbolic element existing within the extracted marker 110; and identifying the type of the designated marker 110 from the identified symbolic element.

Next, the user operates the endpoint device 120 so that the endpoint device 120 requests, Step 1103, definition information (i.e., marker information) on the marker 110 identified in Step 1102 (the designated marker 110*a*) from the central server 130. Step 1103 comprises the endpoint device 120 communicating, to the central server 130, the type of the designated marker, and in response, the requested definition information (i.e., marker information) is obtained by the endpoint device 120 from the central server 130. The obtained marker information comprises a reference size and shape of the designated marker 110 and an identification of a plurality of other markers related to the designated marker 110. The marker information is identified in the central server 130 based on the identified type of the designated marker 110. When the endpoint device 120 has acquired definition information (i.e., marker information) for the designated marker 110*a*, the position calculating unit 123 calculates the positional relationship between the endpoint device 120 and the designated marker 110*a* on the basis of position information for the designated marker 110*a* included in the acquired definition information (Step 1104).

Step 1104 comprises ascertaining a size and shape of the extracted marker 110 from analysis of the extracted marker 110. Step 1104 calculates relative positional information of the endpoint device 120 in relation to the extracted marker 110 from analysis of differences between the ascertained size and shape of the extracted marker and the obtained reference size and shape of the designated marker.

Next, the endpoint device 120 requests additional information on the designated marker 110a, and definition information, additional information and related information on related markers 110b from the central server 130, and the requested information is acquired (Step 1105). Then, the position calculating unit 123 in the endpoint device 120 calculates the positional relationship between the endpoint device 120 and the related markers 110b on the basis of the position information on the related markers 110b included in the definition information of the related markers 110b acquired in Step 1105 (Step 1106). Thus, Step 1106 determines a relative position between the designated marker 110 and each marker of the plurality of other markers.

Next, the display control unit 126 in the endpoint device 120 determines the display priority for objects on the basis of the additional information and related information on each marker 110 acquired in Step 1105 (Step 1107). Then, the display control unit 126 generates an information presenting image synthesizing the image acquired by the image acquiring unit 121 with objects based on additional information on each marker 110 in accordance with the display priority determined in Step 1107 and on the basis of the positional relationships between the endpoint device 120 and each marker 110 calculated by the position calculating unit 123 in Step 1104 and Step 1106, and displays the information presenting image on the display unit 127 (Step 1108). Thus, Step 1108 displays an informational image on the display unit 127 within the endpoint device 120. The displayed image comprises the designated marker 110 and at least one other marker of the plurality of other markers. The designated marker 110 and the at least one other marker are displayed in accordance with the determined relative position between the designated marker 110 and each marker of the at least one other marker.

In one embodiment, the obtained marker information comprises additional information pertaining to the designated marker 110 and additional information pertaining to each marker of the plurality of other markers. The displayed image further comprises (i) the additional information pertaining to and overlapping the designated marker 110 and (ii) the additional information pertaining to and overlapping each marker of the plurality of other markers, as illustrated in FIG. 9.

In one embodiment, the obtained marker information comprises additional information pertaining to an outside marker that exists outside of an imaging range of the image acquiring unit 121, wherein the displayed image further comprises the additional information pertaining to the outside marker.

In one embodiment, the additional information pertaining to the designated marker 110, the additional information pertaining to each marker of the at least one other marker, and the additional information pertaining to the outside marker are displayed within a first object 301, a second object 302, and a third object 303, respectively, and wherein the first object 301, the second object 302, and the third object 303 have different geometric shapes.

In one embodiment, the obtained marker information comprises location information that includes positional information pertaining to the designated marker 110 and positional information pertaining to each marker of the plurality of other markers, wherein determining the relative position between the designated marker 110 and each marker of the plurality of other markers comprises utilizing the obtained location information.

In one embodiment, a totality of markers consists of the extracted marker 110 and the plurality of other markers, wherein the obtained marker information comprises a degree of importance of each marker of the totality of markers, wherein each degree of importance is expressed as a numerical value independently for each marker of the totality of markers. In addition, the inventive method may calculate relative positional information of the endpoint device 120 in relation to each marker of the plurality of other markers from analysis of the obtained location information; and further calculate a display order of each marker of the totality of markers. The display order of each said marker may be calculated as a function of (i) the relative positional information of the endpoint device 120 in relation to said each marker and (ii) the degree of importance of said each marker. In one embodiment, the relative positional information of the endpoint device 120 in relation to each marker of the totality of markers comprises (i) a distance between the endpoint device 120 and said each marker and (ii) an angle (A) between an optical axis of the image acquiring unit 121 and a direction of said each marker as viewed from the endpoint device 120.

In one embodiment, the displayed at least one marker consists of one or more markers of the totality of markers whose calculated display order is less than a specified threshold.

In this operational example, the endpoint device 120 at first only acquires definition information on the designated marker 110a, and acquires the rest of the information after calculating the positional relationship between the endpoint device 120 and the designated marker 110a. However, the order in which information is acquired is not restricted to the order in this example. For example, the endpoint device 120 may also acquire additional information on the designated marker 110a when the definition information on the designated marker 110a is acquired. Because a designated marker 110a has been identified in order to acquire definition information, the central server 130 can send additional information on the designated marker 110a to the endpoint device 120 together with the definition information. In this case, the endpoint device 120 acquires the definition information, additional information and related information on the related markers 110b after the positional relationship between the endpoint device 120 and the designated marker 110a has been calculated.

The endpoint device 120 may also acquire definition information on the related markers 110b related to the designated marker 110a when the definition information on the designated marker 110a is acquired. Because a designated marker 110a has been identified in order to acquire definition information, the central server 130 can identify the related markers 110b related to the designated marker 110a and send definition information on the related markers 110b related to the designated marker 110a to the endpoint device 120 together with the definition information for the designated marker 110a. In this case, the endpoint device 120 can calculate the positional relationships between the endpoint device 120, the designated marker 110a and the related markers 110b together on the basis of the definition information acquired on the designated marker 110a and the related markers 110b. Then, the endpoint device 120 acquires additional information and related information on the designated marker 110a and related markers 110b after the positional relationships between the endpoint device 120, the designated marker 110a, and the related markers 110b have been calculated.

Additional information on the designated marker 110a, and definition information, additional information and related information on the related markers 110b can all be acquired when the endpoint device 120 acquires definition information on the designated marker 110a. Because a designated marker 110a has been identified in order to acquire definition information, the central server 130 can identify the related markers 110b related to the designated marker 110a, and send definition information, additional information, and related information on each marker 110 to the endpoint device 120. In this case, the endpoint device 120 can calculate the positional relationships between the endpoint device 120 and each of the markers 110 on the basis of the definition information acquired on the markers 110. The endpoint device 120 then generates an information presenting image on the basis of the acquired additional information and related information on each marker 110, and displays the information presenting image on the display unit 127.

The endpoint device 120 may also acquire definition information on each marker 110 before identifying a designated marker 110a (that is before extracting an image of a marker 110). In this case, definition information related to all markers 110 managed by the information presenting system in the present embodiment is acquired by the endpoint device 120 irrespective of the relationship between markers 110. When information on the geometric elements and symbolic elements of the markers 110 is included in the definition information, the endpoint device 120 can acquire the information on the geometric elements and symbolic elements of the markers 110 when the definition information on each marker 110 is initially acquired by the endpoint device 120. As a result, the endpoint device 120 can extract an image of a marker 110 with a special shape and identify the type of marker 110 even when the service provided by the information presenting system of the present embodiment is provided using specially shaped markers 110 used only in certain places such as shopping centers and warehouses.

As mentioned above, the endpoint device 120 can identify the position of the endpoint device 120 in a space including a designated marker 110a and related markers 110b, and the endpoint device 120 can identify the position of related markers 110b visible from the position of the endpoint device 120. However, when the endpoint device 120 moves, the relative position between the endpoint device 120 and each marker 110 changes, and the positions of the objects displayed in the information presenting image shift. Therefore, the endpoint device 120 may acquire information related to each marker 110 from the central server 130 at a given time interval (for example, periodically), correct the position of each identified marker 110, and update the objects displayed in the information presenting image. In this case, the priority specifying value of each marker 110 changes because the positional relationship between the endpoint device 120 and each marker 110 changes. Therefore, the objects to be displayed and the display target of each object are updated on the basis of the changed priority specifying values.

In the present embodiment, the display of objects differs on the basis of the display priority explained with reference to FIG. 10, and the operator of the endpoint device 120 can indicate a desired marker 110, and display the object for the indicated marker 110 on the information presenting image. In this case, the display control unit 126 displays an image of a list of markers 110 with acquired additional information on the display unit 127 after additional information and related information on markers 110 has been acquired from the central server 130.

Figure 12:
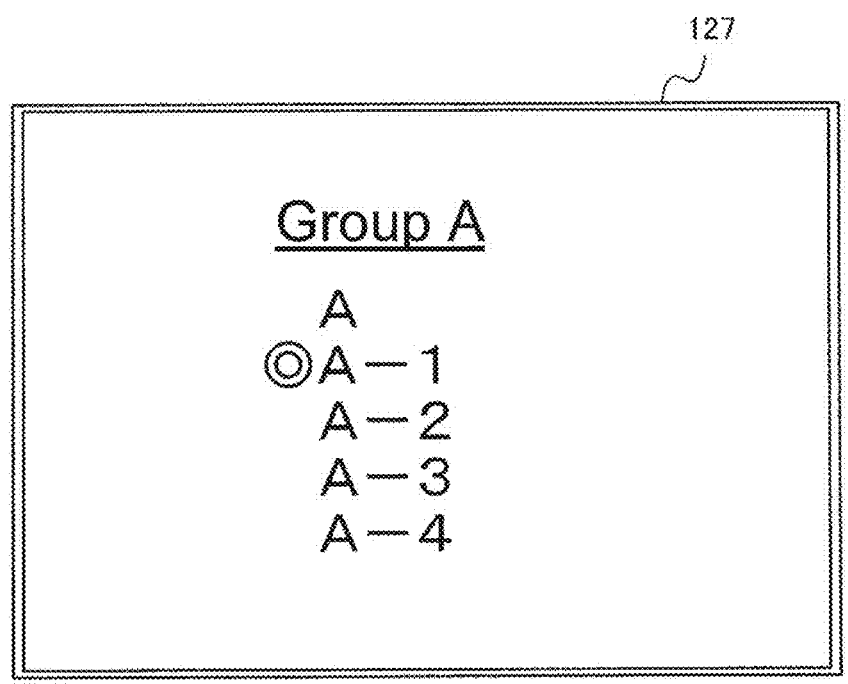
FIG. 12 is a diagram showing an example of an image of a list of markers displayed on the display unit, in accordance with embodiments of the present invention.

FIG. 12 is a diagram showing an example of an image of a list of markers 110 displayed on the display unit 127, in accordance with embodiments of the present invention. For example, among the categories of markers 110 shown in FIG. 8, an image related to marker "A-1" is acquired by the image acquiring unit 121 of the endpoint device 120, and this is established as the designated marker 110a. The other markers 110 in Group A to which marker "A-1" belongs are set as related markers 110b, and the endpoint device 120 acquires additional information on each marker 110 belonging to Group A from the central server 130. As shown in FIG. 12, an image of a list of the markers 110 in Group A shown in FIG. 8 is displayed on the display unit 127. In the example shown in FIG. 12, a mark (⊙) is affixed to marker "A-1" serving as the designated marker 110a. Marker "A", which is the parent of Group A is placed at the top of the list.

The operator of the endpoint device 120 references additional information from the list of markers 110 displayed on the display unit 127, and selects the desired marker 110. Next, the display control unit 126 generates an information presenting image including an object for the selected marker 110, and displays the information presenting image on the display unit 127. The operator then checks the displayed information presenting image to find the position and additional information on the selected marker 110. Because the endpoint device 120 is aware of the position of each marker 110 visible from the endpoint device 120, the position of a marker 110 can be displayed in the information presenting image even when the selected marker 110 is in a location that is not visible to the operator.

Another example of an information presenting image will now be explained. In the following explanation, the information presenting image is created by synthesizing an image acquired by the image acquiring unit 121 in the endpoint device 120 and objects based on additional information on markers 110. However, the information presenting image may also present to the operator of the endpoint device 120 additional information on a marker 110 together with the position of the marker 110. In other words, there are no restrictions on the configuration used to synthesize objects with an image acquired by the image acquiring unit 121.

Figure 13:
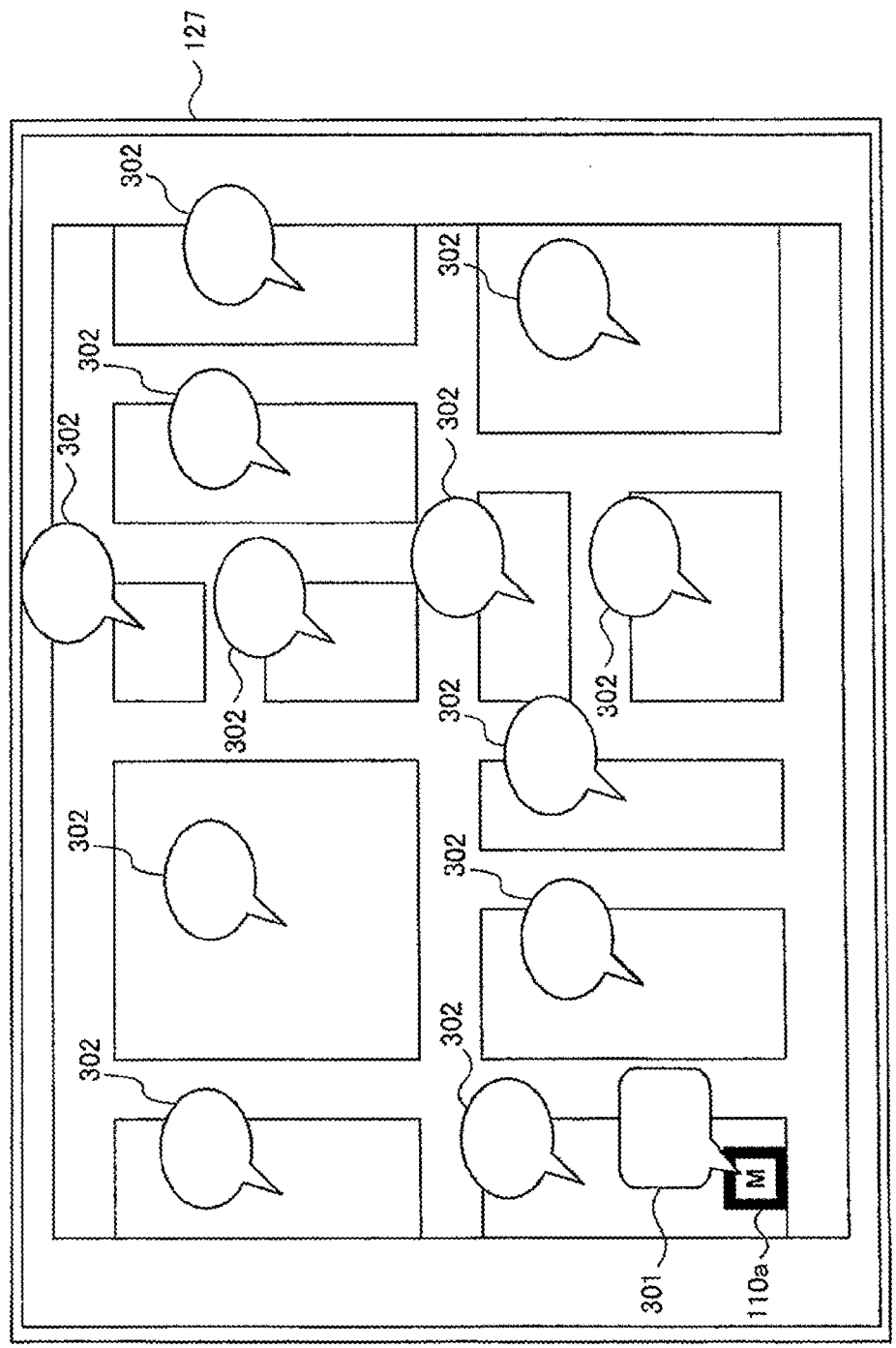
FIG. 13 is a diagram showing another example of an information presenting image, in accordance with embodiments of the present invention.

FIG. 13 is a diagram showing another example of an information presenting image, in accordance with embodiments of the present invention. In the example shown in FIG. 13, the information presenting image is an image in which objects 301, 302 based on additional information for markers 110 have been synthesized with a map or floor plan of the area including the markers 110. This information presenting image is displayed on the display unit 127. In other words, an image acquired by the image acquiring unit 121 is not used in the information presenting image. The map or floor plan used in the information presenting image in this example can be acquired from the central server 130. In this image configuration, the positions of each marker 110 can be easily grasped by the display of the objects 301, 302. As a result, the user easily understands the relative positional relationship between each marker 110. Even when there are obstacles between the endpoint device 120 and the markers 110, the user can easily find the routes required to reach the location of a marker 110. When an information presenting image with this configuration is used, an object representing the position of the endpoint device 120 (not shown) may be displayed in the information presenting image. Because the position of the endpoint device 120 in the space including the markers 110 is known, the position of the endpoint device 120 can be easily changed on the map or floor plan displayed in the information presenting image.

Figure 14:
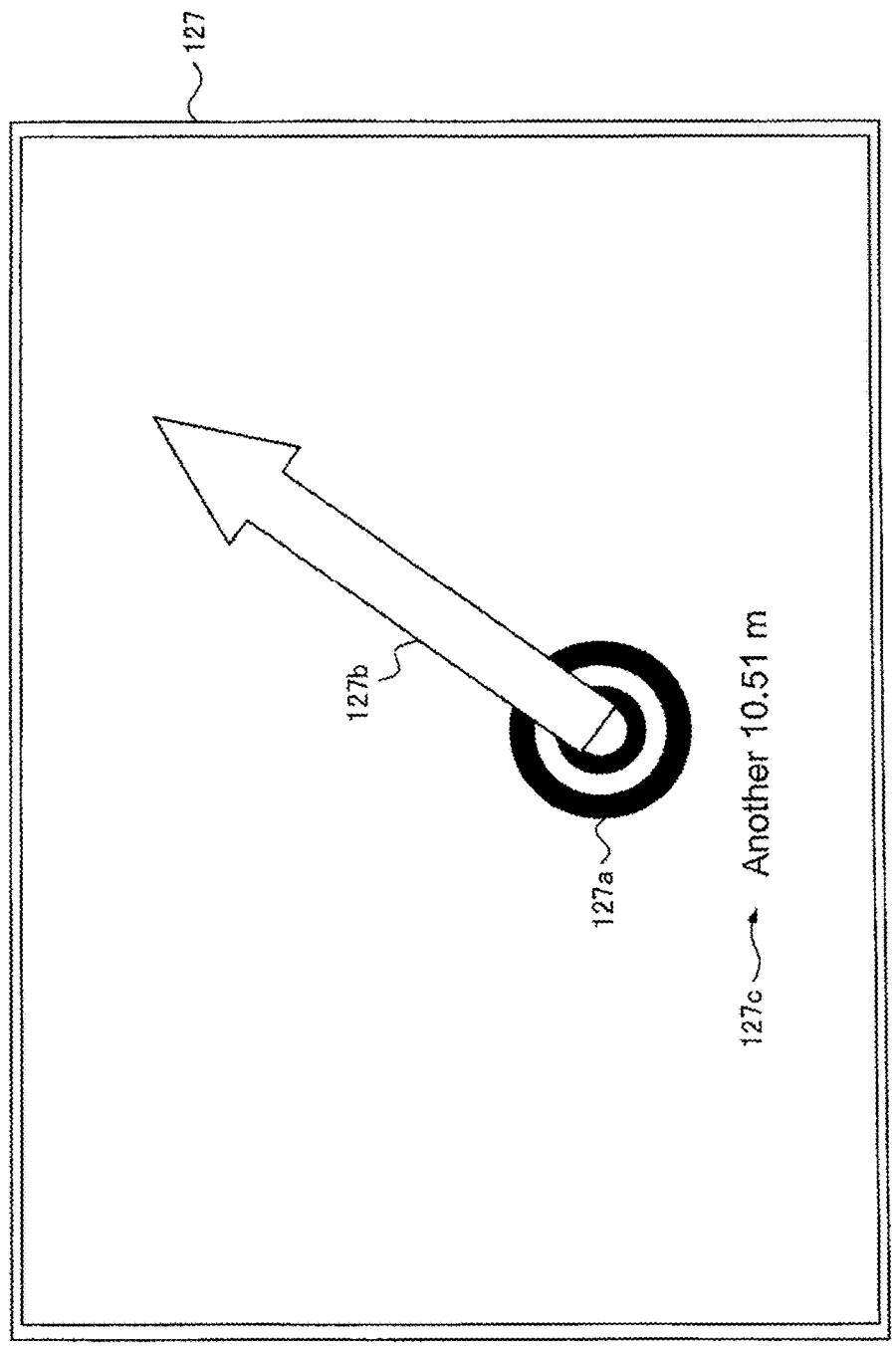
FIG. 14 is a diagram showing another example of an information presenting image, in accordance with embodiments of the present invention.

FIG. 14 is a diagram showing another example of an information presenting image, in accordance with embodiments of the present invention. In the example shown in FIG. 14, the distance and direction to the location of a marker 110 as viewed from the current position of the endpoint device 120 is displayed on the display unit 127. In the example shown in FIG. 14, the direction from the indicator 127a of the current position (indicated by the "⊙" mark in the drawing) is indicated by the arrow 127b, and the distance is indicated using text 127c ("Another 10.51 m" in the drawing). In other words, an image acquired by the image acquiring unit 121 and objects for markers 110 are not used in the information presenting image. When information related to a marker 110 selected by the user is presented and a particular marker 110 is the target, the amount of information used in the information presenting image can be reduced and the display of unnecessary information eliminated. This makes the required information related to a particular marker 110 easier to recognize.

Figure 15A:
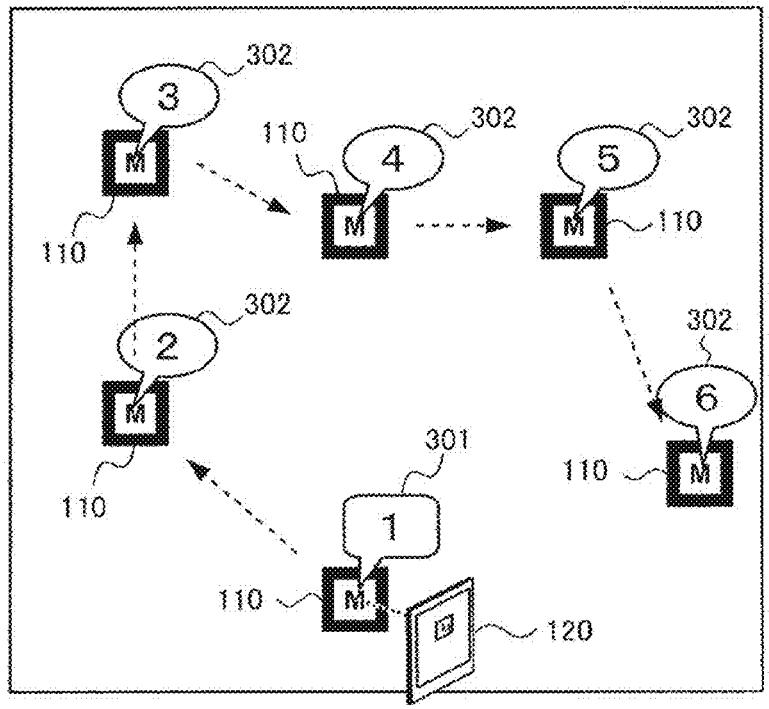
FIGS. 15(a) and 15(b) showing an example of an application for the information presenting system, in accordance with embodiments of the present invention.
Figure 15B:
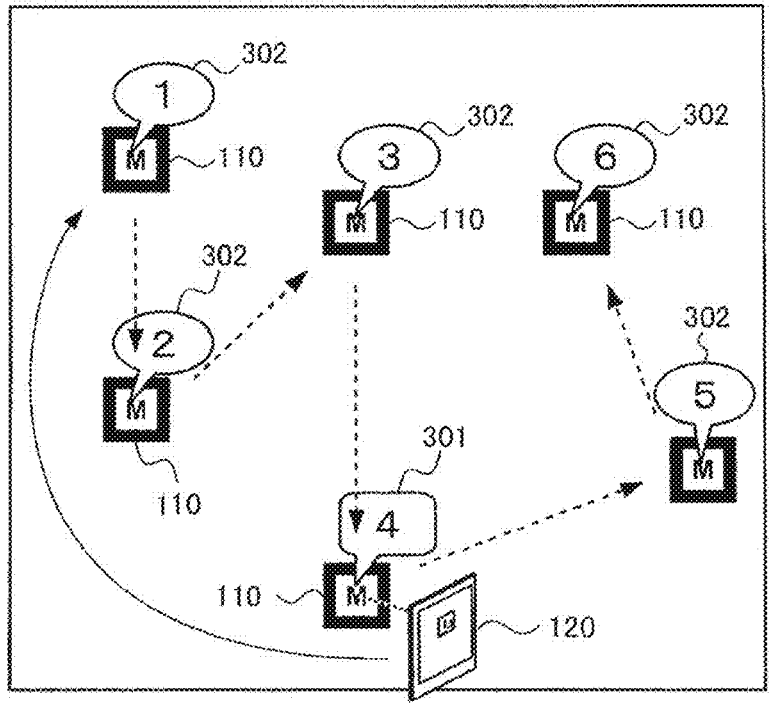

FIGS. 15(a) and 15(b) show an example of an application for the information presenting system 100, in accordance with embodiments of the present invention. In this example of an application, markers 110 are arranged at locations that need to be inspected by an inspector, who is also the operator of the endpoint device 120. Each marker 110 is associated with the others by related information. Information on each marker 110 at the locations to be inspected and information on the order of inspection are included in the additional information for each marker 110.

In this configuration, the inspector first acquires an image of any of the markers 110, and the additional information and related information on the marker 110 are acquired from the central server 130. The marker 110 at the initial location to be inspected and the marker 110 at the next location to be inspected can be learned based on the additional information and the related information. The marker 110 captured in the image is at a subsequent location to be inspected. The locations of the markers 110 and objects 301, 302 indicating the order of inspection are shown in the information presenting image displayed on the display unit 127 of the endpoint device 120. In FIG. 15(a) and FIG. 15(b), the numbers in the objects 301, 302 indicate the order of inspection.

When the initial location to be inspected has the marker 110 captured in the image as shown in FIG. 15(a), the inspector inspects the location and then moves to the next location to be inspected based on the information on the order of inspection included in the related information on the markers 110. The inspector moves to and inspects each location in sequential order in accordance with the related information until the final inspection location with a marker 110 has been reached.

When the initial location to be inspected does not have the marker 110 captured in the image as shown in FIG. 15(b), the inspector moves to the initial location to be inspected based on the information on the order of inspection included in the related information on the markers 110. The inspector begins the inspection at this location and then moves to and inspects each location in sequential order in accordance with the related information until the final inspection location with a marker 110 has been reached.

In this example of an application, the order of inspection is determined by additional information on the marker 110 at each location to be inspected. As a result, the order of inspection can be easily changed by updating the additional information of each marker 110 stored in the marker information storage unit 132 at the central server 130.

Figure 16A:
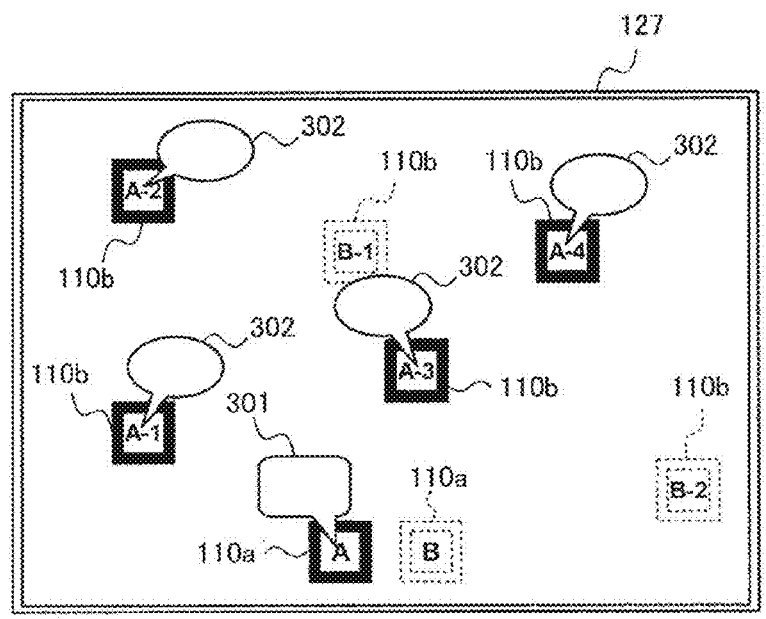
FIGS. 16(a) and 16(b) show an example of another application for the information presenting system, in accordance with embodiments of the present invention.
Figure 16B:
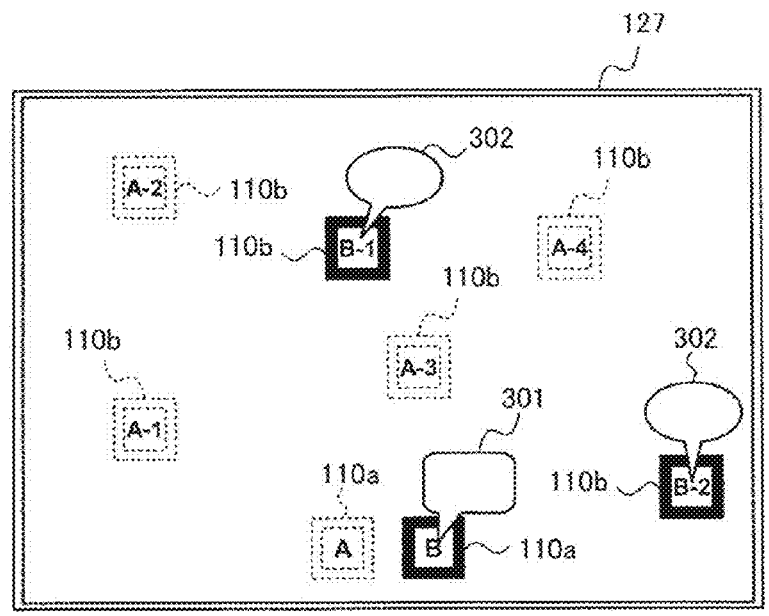

FIGS. 16(a) and 16(b) show an example of another application for the information presenting system 100, in accordance with embodiments of the present invention. In this example of an application, markers 110 grouped according to the appropriate management system are arranged at locations to be managed in accordance with a plurality of management systems at the same site. In FIG. 16(a) and FIG. 16(b), the markers 110 displayed on the display unit 127 are classified using Group A and Group B explained above with reference to FIG. 8. In the drawing, the marker 110 that is the parent of Group A is marked by the letter "A" indicating the group to which it belongs, and the marker 110 that is the parent of Group B is marked by the letter "B" indicating the group to which it belongs. All other markers 110 belonging to each group are marked by the letter "A" or "B" indicating the group to which it belongs and a sub number.

The manager, who is also the operator of the endpoint device 120, uses the image acquiring unit 121 of the endpoint device 120 to acquire an image of a marker 110 that is the parent of a group associated with the management system to be managed by the manager, and the marker 110 acquired in the image is established as the designated marker 110a. In this way, the related markers 110b belonging to the same group as the designated marker 110a are identified, and an object 301 for the designated marker 110a, and objects 302 for the related markers 110b are displayed in the information presenting image so the manager knows what has to be managed.

When marker "A" is the designated marker 110a as shown in FIG. 16(a), markers "A-1" through "A-4" belonging to Group A are identified as related markers 110b. Then, an object 301 for the designated marker 110a (marker "A") and objects 302 for the related markers 110b (markers "A-1" through "A-4") are displayed in the information presenting image on the display unit 127. In FIG. 16(a), the markers 110 belonging to Group B, which is associated with a different management system from Group A, are displayed using dotted lines.

When marker "B" is the designated marker 110a as shown in FIG. 16(b), markers "B-1" and "B-2" belonging to Group B are identified as related markers 110b. Then, an object 301 for the designated marker 110a (marker "B") and objects 302 for the related markers 110b (markers "B-1" and "B-2") are displayed in the information presenting image on the display unit 127. In FIG. 16(b), the markers 110 belonging to Group A, which is associated with a different management system from Group B, are displayed using dotted lines.

The following is an explanation of a variation on the example of an application explained above with reference to FIGS. 16(a) and 16(b). In the example of an application explained with reference to FIGS. 16(a) and 16(b)(, the markers 110 belonging to the same group as the designated marker 110a are identified as related markers 110b by selecting the marker 110 that is the parent of each group as the designated marker 110a. Each marker 110 and objects 301, 302 for each marker 110 are then displayed in the information presenting image. However, markers 110 in different groups could also be displayed in the information presenting image based on the attributes of the user of the endpoint device 120 even when the same marker 110 has been identified as the designated marker 110*a*.

Figure 17A:
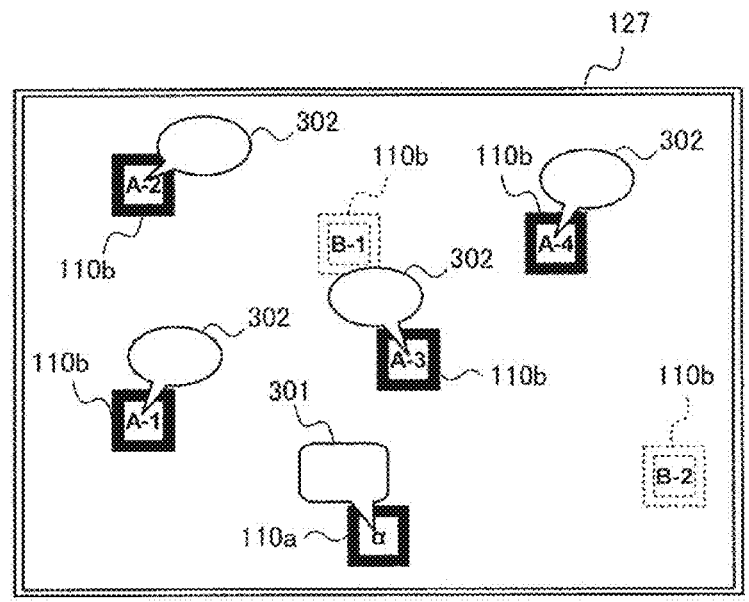
FIGS. 17(a) and 17(b) show a variation on the application example shown in FIGS. 16(a) and 16(b), in accordance with embodiments of the present invention.
Figure 17B:
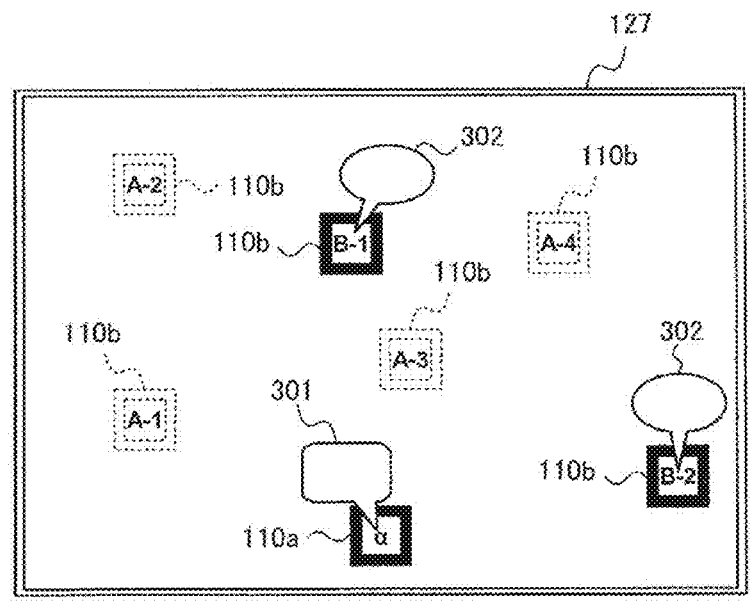

FIGS. 17(*a*) and 17(*b*) show a variation on the application example shown in FIGS. 16(*a*) and 16(*b*), in accordance with embodiments of the present invention. In the variation shown in FIGS. 17(*a*) and 17(*b*), as in the example shown in FIGS. 16(*a*) and 16(*b*), markers 110 grouped according to the appropriate management system are arranged at locations to be managed in accordance to a plurality of management systems at the same site. In FIG. 16(*a*) and FIG. 16(*b*), the markers 110 displayed on the display unit 127 are classified using Group A and Group B explained above with reference to FIG. 8. All other markers 110 belonging to each group are marked by the letter "A" or "B" indicating the group to which it belongs and a sub number. In the example shown in FIGS. 17(*a*) and 17(*b*), the marker 110 that is the parent of all groups, including Group A and Group B, is marked by the letter "α".

The manager, who is also the operator of the endpoint device 120, uses the image acquiring unit 121 of the endpoint device 120 to acquire an image of a marker 110 that is the parent of all groups (marker "α"), and marker "α" acquired in the image is established as the designated marker 110*a*. Then, information on the attributes of the user of the endpoint device 120 is sent along with information on the designated marker 110*a* from the endpoint device 120 to the central server 130. Here, the attributes of the user are associated with that is to be managed by the manager, who is also the user of the device. For example, when the user (manager) is an inspector of electrical equipment, the objects to be managed are objects whose electrical systems are to be inspected. When the user (manager) is an inspector of mechanical equipment, the object to be managed is machinery to be inspected. A marker 110 belonging to Group A is placed at the location of objects whose electrical systems are to be inspected, and a marker 110 belonging to Group B is placed at the location of machinery to be inspected.

When, for example, the user of the endpoint device 120 is an inspector of electrical equipment, and information on the attributes of the user has been sent along with information on the designated marker 110*a* (marker "α") from the endpoint device 120 to the central server 130, the central server 130 determines, on the basis of the received information, that the attributes of the user correspond to markers 110 belonging to Group A. Then, the central server 130 identifies markers "A-1" through "A-4" belonging to Group A as related markers 110*b* related to the designated marker 110*a* (marker "α"). Afterwards, additional information on marker "α" which is the designated marker 110*a* and definition information and additional information on markers "A-1" through "A-4" belonging to Group A which are related markers 110*b* are sent from the central server 130 to the endpoint device 120. In this way, as shown in FIG. 17(*a*), an information presenting image is displayed on the display unit 127 which includes an object 301 for the designated marker 110*a* (marker "α") and objects 302 for the related markers 110*b* (markers "A-1" through "A-4).

When the user of the endpoint device 120 is an inspector of mechanical equipment, and information on the attributes of the user has been sent along with information on the designated marker 110*a* (marker "α") from the endpoint device 120 to the central server 130, the central server 130 determines, on the basis of the received information, that the attributes of the user correspond to markers 110 belonging to Group B. Then, the central server 130 identifies markers "B-1" and "B-2" belonging to Group B as related markers 110*b* related to the designated marker 110*a* (marker "α"). Afterwards, additional information on marker "α" which is the designated marker 110*a* and definition information and additional information on markers "B-1" and "B-2" belonging to Group B which are related markers 110*b* are sent from the central server 130 to the endpoint device 120. In this way, as shown in FIG. 17(*b*), an information presenting image is displayed on the display unit 127 which includes an object 301 for the designated marker 110*a* (marker "α") and objects 302 for the related markers 110*b* (markers "B-1" and "B-2).

Figure 18A:
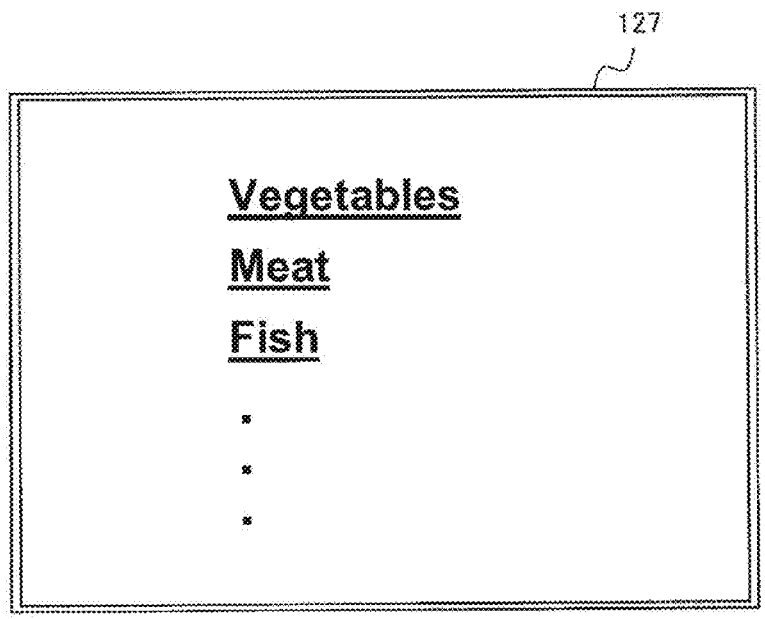
FIGS. 18(a) and 18(b) show another application example of the information presenting system, in accordance with embodiments of the present invention.
Figure 19:
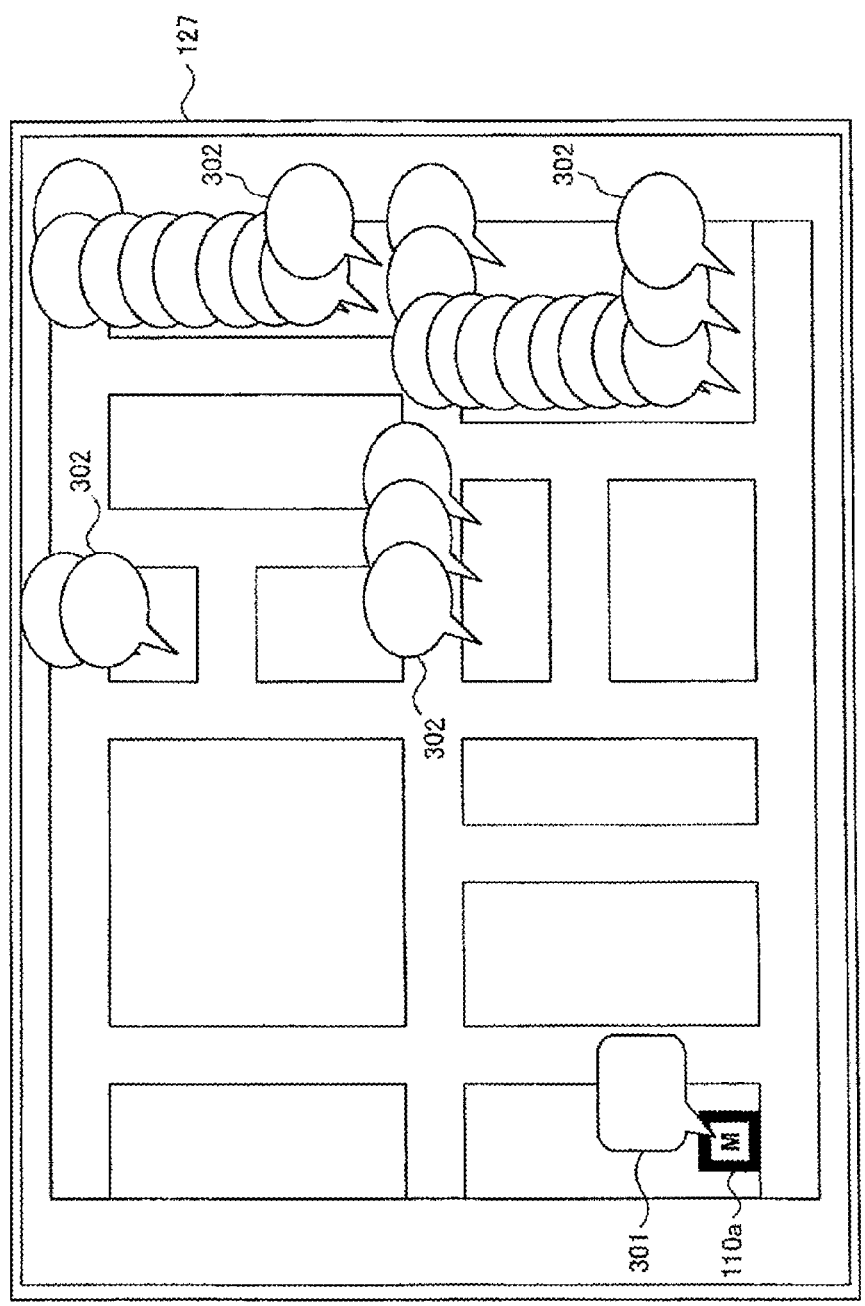
FIG. 19 is a diagram showing an example of an information presenting image, in accordance with embodiments of the present invention.
Figure 20:
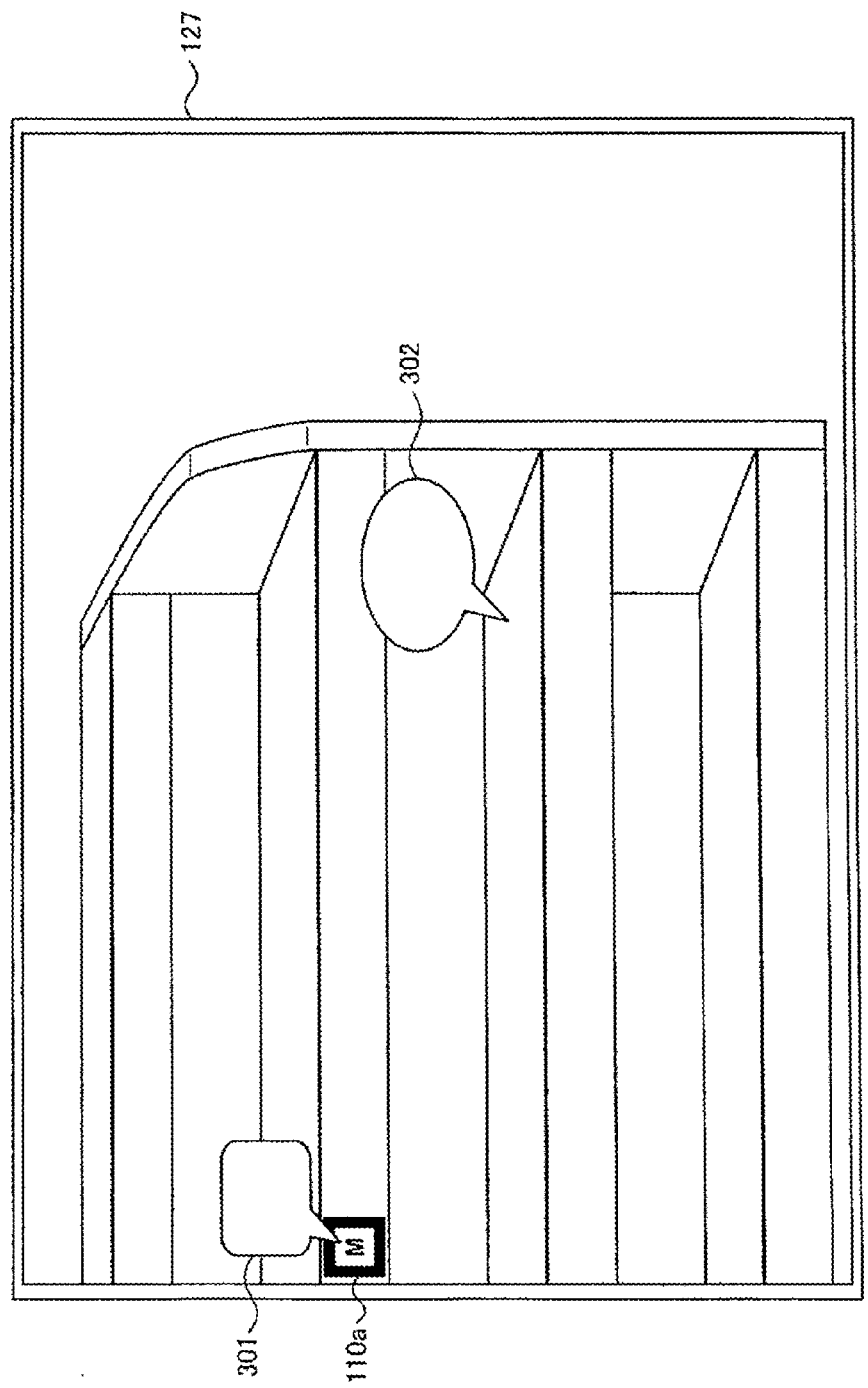
FIG. 20 is a diagram showing another example of an information presenting image, in accordance with embodiments of the present invention.

FIGS. 18(*a*) and 18(*b*), 19 and 20 are diagrams showing other application examples of the information presenting system 100, in accordance with embodiments of the present invention. FIG. 18(*a*) and FIG. 18(*b*) show examples of index images used to select groups and items. FIG. 19 and FIG. 20 are diagrams showing other examples of information presenting images. In these application examples, the information related to products at the locations of the markers 110 include additional information on the markers 110. Here, the present embodiment is used to indicate the locations of products in a grocery store at a shopping center.

In this specific example, the markers 110 are arranged on a floor of a grocery store (for example, on product shelves and at each corner). The markers 110 arranged at locations including products (food products) are associated with the products in the grocery store. The products are classified according to categories such as "vegetables", "meat" and "fish". The product categories do not have to correspond to the groupings of markers 110 explained above with reference to FIG. 8. In this specific example, as described below in greater detail, the operator of the endpoint device 120 specifies certain products. The marker 110 associated with a specified product is treated as a related marker 110*b*. In other words, in this specific example, a related marker 110*b* related to the designated marker 110*a* captured in an image is selected by the operator. Information on product classification may be stored on the central server 130, or on a product management server separate from the central server 130. In the example explained below, the product classification information is stored on the central server 130.

A shopper who is the operator of the endpoint device 120 first operates the endpoint device 120 to display an image of an index of products on the display unit 127. In the present embodiment, the images of the index include an image of the major categories created on the basis of product classification, and subcategories created for individual products. The image of the major categories is displayed initially, and the image of a subcategory for products (items) belonging to a major category item is displayed when a major category item (type of product) has been selected in the image of the major categories. Images of the index created beforehand are stored on the server for holding product category information (the central server 130 or a product management server), and the endpoint device 120 may acquire an image of the index from the server and display the image. The endpoint device 120 may also acquire product category information from the server, create an image of an index, and display the image on the display unit 127.

Figure 18B:
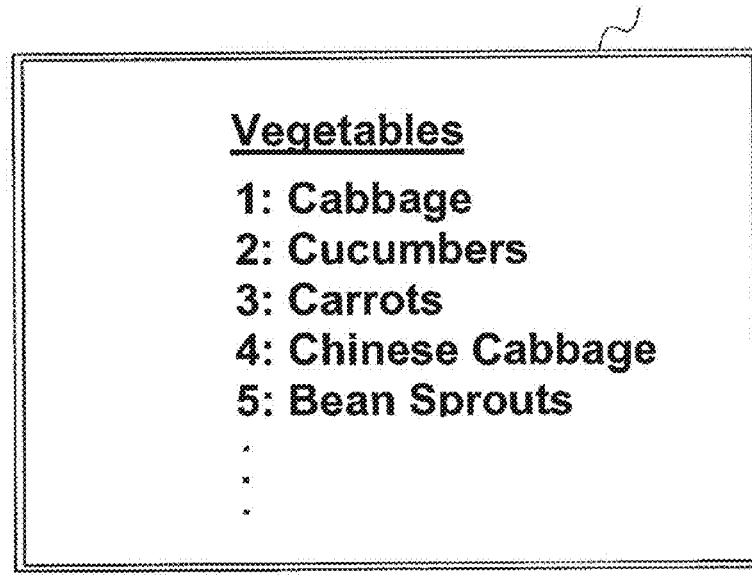

In this specific example, as shown in FIG. 18(*a*), the category items "vegetables", "meat", "fish", etc. established based on the types of food products available are displayed in the image of the major category index on the display unit 127. Next, when the operator has selected a category item, subcategories of the category item are displayed. Here, "vegetables" have been selected. Then, as shown in FIG. 18(*b*), subcategories of "vegetables" (1: Cabbage, 2: Cucumbers, 3: Carrots, etc.) are displayed in the image of the index on the display unit 127. The operator then selects the desired item in the image of the index in FIG. 18(b). The desired item may be an individual item displayed in a subcategory, or a type of item corresponding to a major category item. More than one item or type of item can be indicated. Any combination of items and types of item can be selected (for example, "cabbage" belonging to "vegetables", and "meat).

Next, the shopper who is the operator of the endpoint device 120 uses the image acquiring unit 121 in the endpoint device 120 to capture an image of an appropriate nearby marker 110. The endpoint device 120 then identifies the marker 110 captured in the image, designates the identified marker 110 as the designated marker 110a, and requests different types of information on the designated marker 110a and related markers 110b from the central server 130. At this time, the endpoint device 120 also sends information selected from the index images (products, etc.) to the central server 130. The central server 130 establishes markers 110 associated with the selected information as related markers 110b, and sends definition information and additional information on each marker 110 to the endpoint device 120. Here, when a selected item is a product, the marker 110 associated with the product can be established as a related marker 110b. When a selected item is a type of product, each marker 110 associated with a product included in the product type can be established as related markers 110b.

However, in this specific example, the markers 110 do not have to be established by product. The markers 110 may be associated with the locations of the markers 110, and not with individual products. In this specific example, products and markers 110 are associated with each other via the locations of the products. Therefore, when cabbage and carrots are placed near each other, a marker 110 may simply be placed near the carrots, and the marker 110 may be associated with both "cabbage" and "carrots". When the location of cabbage is also to be identified by the marker 110, information on the location of cabbage is included in the additional information on the marker 110.

When the endpoint device 120 acquires definition information and additional information on each marker 110 from the central server 130, the position calculating unit 123 uses the definition information on the designated marker 110a (the marker 110 captured in an image by the image acquiring unit 121) to calculate the positional relationship between the designated marker 110a and the endpoint device 120. The position calculating unit 123 also uses definition information on related markers 110b (markers 110 associated with selected items) to calculate the positional relationship between the related markers 110b and the endpoint device 120. Then, the display control unit 126 displays on the display unit 127 an information presenting image including objects based on the additional information on each marker 110 acquired from the central server 130 on the basis of the positional relation information calculated by the position calculating unit 123.

FIG. 19 is a diagram showing one way of creating an information presenting image, in accordance with embodiments of the present invention. The information presenting image shown in FIG. 19 is an image synthesizing a floor plan of the shopping center with objects 301, 302 for the designated marker 110a and related markers 110b. Here, the type of products that were selected are vegetables. In the information presenting image shown in FIG. 19, therefore, the locations of vegetables are displayed on the floor plan using objects 302 for related markers 110b associated with vegetables. Also, the indicator 127a, arrow 127b and text 127c indicating distance in FIG. 14 may be displayed in the information presenting image shown in FIG. 19 to indicate the direction to the vegetables from the current location and the distance to the vegetables from the current location. When several of the markers 110 in the example shown in FIG. 19 are related markers 110b, the direction indicated by the arrow 127b can be the direction to a representative location determined from the locations of each related marker 110b. For example, the representative location may be the center of the area including each of the related markers 110b.

FIG. 20 is a diagram showing another way of creating an information presenting image, in accordance with embodiments of the present invention. The information presenting image shown in FIG. 20 is an image synthesizing an image of shelves acquired by the image acquiring unit 121 with objects 301, 302 for the designated marker 110a and a related marker 110b associated with a selected product (items). Here, the selected item is cabbage. In the information presenting image shown in FIG. 20, the location of the cabbage is indicated using an object 302 for the related marker 110b associated with cabbage. In the information presenting image shown in FIG. 20, the related marker 110b does not have to be arranged where the cabbage is actually located. The related marker 110b can be placed near the cabbage (for example, above or below a shelf or on a different level). When the position of the cabbage relative to the related marker 110b is registered as additional information on the related marker 110b, the object 302 indicating the position of the cabbage can be displayed at the location of the cabbage in the information presenting image.

In the explanation above, the information presenting image shown in FIG. 19 is displayed when the type of product is indicated using an index image, and the information presenting image shown in FIG. 20 is displayed when a product is indicated using an index image. However, selection of the information presenting image shown in FIG. 19 or the information presenting image shown in FIG. 20 is not restricted to this example. For example, the information presenting image shown in FIG. 19 can be displayed when the distance between the endpoint device 120 and a related marker 110b associated with a selected item is greater than a predetermined threshold value, and the information presenting image shown in FIG. 20 can be displayed when the distance is less than the threshold value. The operator can also switch between the information presenting image shown in FIG. 19 and the information presenting image shown in FIG. 20 by performing a certain input operation.

Also, when the selected item is a product and the information presenting image shown in FIG. 19 is displayed, an object 302 for the related marker 110b associated with the product does not have to be displayed. Instead, the location of related markers 110b associated with the type of product selected (items in the major category) may be displayed. Here, instead of displaying an object 302 in the information presenting image, the indicator 127a, arrow 127b and text 127c indicating distance in FIG. 14 may be displayed to indicate the direction to the selected item from the current location and the distance to the selected item from the current location. Because there are usually several related markers 110b associated with the type of product that has been selected, the direction indicated by the arrow 127b may be the direction to the center of the area including each related marker 110b (a representative location) as explained above with reference to FIG. 19. For example, the operator of the endpoint device 120 can move towards the general location of specific items that have been selected, such as cabbage and carrots, using a floor plan indicating the general location of vegetables (for example, the fresh produce department) which include the cabbage and carrots that have been selected. The location of markers 110 associated with types of products can also be indicated by preparing markers 110 associated with types of products (such as "vegetables"), placing the markers near the center of the area including those types of products (such as the fresh product department), and indicating the location of these products using an arrow.

Figure 21:
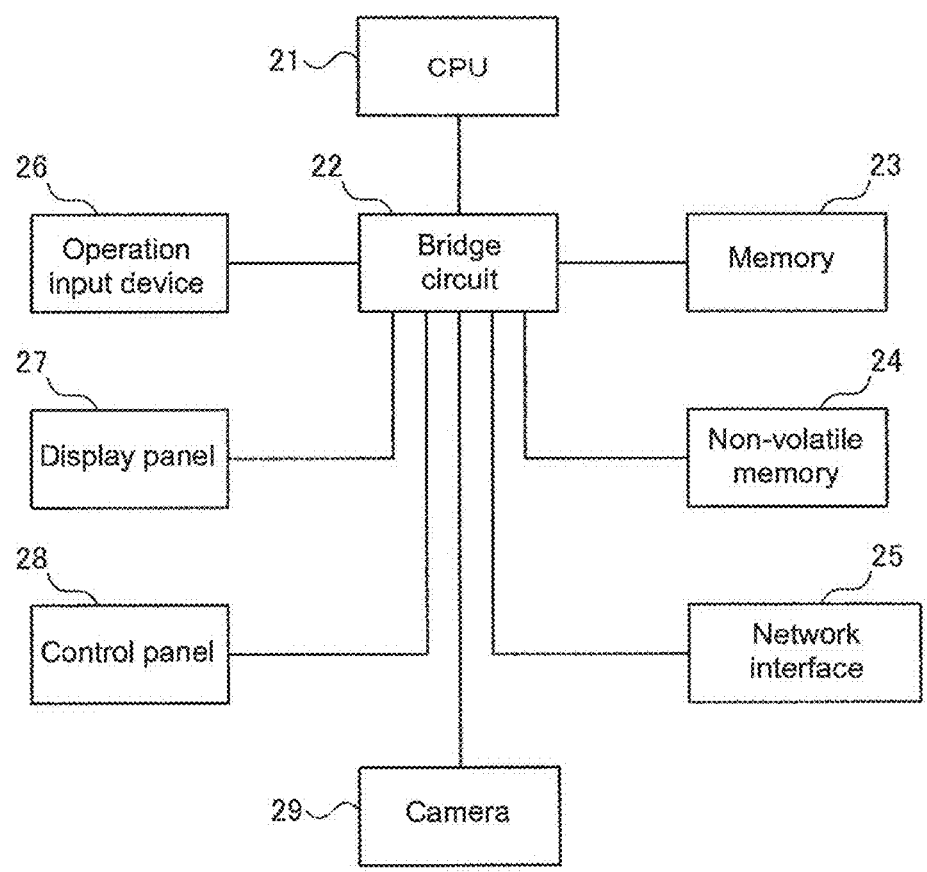
FIG. 21 is a diagram showing a hardware configuration suitable for use in the endpoint device, in accordance with embodiments of the present invention.

FIG. 21 is a diagram showing a hardware configuration suitable for use in the endpoint device 120, accordance with embodiments of the present invention. In this explanation, it is applied to a tablet computer. The computer shown in FIG. 21 includes a CPU (central processing unit) 21, a bridge circuit 22, memory 23, non-volatile memory 24, a network interface 25, an operation input device 26, a display panel 27, a control panel 28, and a camera 29. These configuration elements are connected to the CPU 21 computing means via the bridge circuit 22.

The memory 23 in FIG. 21 is used as operating memory for CPU 21 processing and as a storing means for storing processing results. The operating system (OS) and application programs are stored in the non-volatile memory 24. Various functions, such as those of the image processing unit 122, position calculating unit 123 and display control unit 126 are realized in the endpoint device 120 by having the CPU 21 execute these programs. The memory unit 124 is realized by the memory 23 and non-volatile memory 24. The transmitting and receiving unit 125 are realized by the network interface 25. The display unit 127 is realized by the display panel 27, and the image acquiring unit 121 is realized by the camera 29.

FIG. 21 merely shows an example of a hardware configuration suitable for realizing the endpoint device 120 in the present embodiment. Any means and configuration may be used to realize the endpoint device 120 in the present embodiment as long as it can identify a marker 110 by analyzing an image of a marker 110 acquired by the image acquiring unit 121, acquire additional information and related information on markers 110 from the central server 130 on the basis of the identified marker 110, and display an information presenting image including objects for each marker 110 on the basis of the acquired additional information and related information. Both the embodiment described above and various changes and improvements to the embodiment are included in the technical scope of the present invention.

Figure 22:
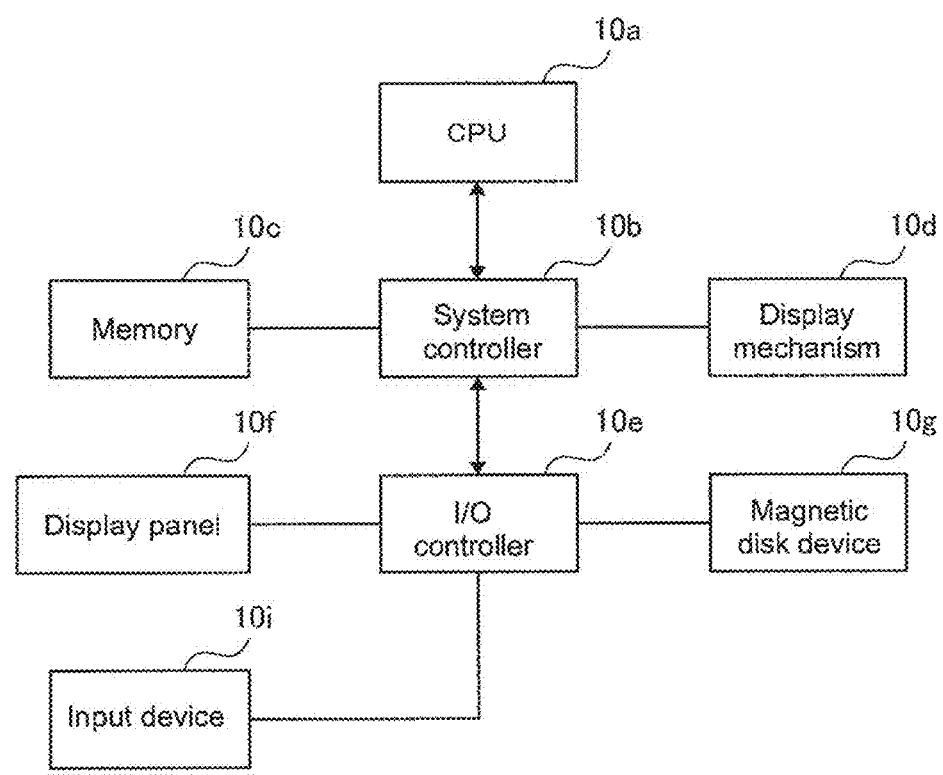
FIG. 22 is a diagram showing a hardware configuration suitable for use in the central server, in accordance with embodiments of the present invention.

FIG. 22 is a diagram showing a hardware configuration suitable for use in the central server 130, in accordance with embodiments of the present invention. In this explanation, it is applied to a computer. The computer shown in FIG. 22 includes a central processing unit (CPU) 10a as a computing means, and memory 10c as the main memory means. It also includes, as external devices, a magnetic disk device (HDD: Hard Disk Drive) 10g, a network interface 10f, a display mechanism 10d including a display device, and input devices 10i such as a keyboard and mouse.

In the example shown in FIG. 22, the memory 10c and the display mechanism 10d are connected to the CPU 10a via a system controller 10b. The network interface 10f, magnetic disk device 10g, and input devices 10i are also connected to the system controller 10b via the I/O controller 10e. Each configurational element is connected via the appropriate type of bus such as a system bus or input/output bus.

In FIG. 22, the OS program and application programs are stored in the magnetic disk device 10g. The functions of the data processing unit 133 in the central server 130 are realized by reading these programs in the memory 10c and executing them in the CPU 10a. The marker information storage unit 132 is realized by the memory 10c and the magnetic disk device 10g. The transmitting and receiving unit 131 is realized by the network interface 10f.

FIG. 22 merely shows an example of a hardware configuration suitable for realizing the central server 130 in the present embodiment. Any means may be used to realize the central server 130 in the present embodiment as long as the additional information and related information on markers 110 have been classified into groups and stored, related markers 110b associated with the specified marker 110a are specified on the basis of information on the specified marker 110a acquired from the endpoint device 120, and the additional information and related information on the specified marker 110a and the related markers 110b are returned to the endpoint device 120. Both the embodiment described above and various changes and improvements to the embodiment are included in the technical scope of the present invention.

In one embodiment, the present invention provides a computer program product, comprising a memory unit having computer readable program code stored therein, said program code containing instructions which, upon being executed by an endpoint device that comprises an image acquiring unit and a display unit, implements the methods of the present invention. In one embodiment, the present invention provides an endpoint device, said device comprising an image acquiring device, a display unit, and a memory unit having computer readable program code stored therein, said program code containing instructions which, upon being executed by the device, implements the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for displaying information relating to a designated marker, said method comprising:
   acquiring, by an image acquiring unit of an endpoint device that comprises a display unit, an image including the designated marker;
   extracting the designated marker from the acquired image;
   identifying a type of the designated marker from the extracted marker;
   identifying additional information on the designated marker;
   prioritizing the additional information;
   communicating the identified type of the designated marker to a server external to the endpoint device;
   in response to the communicating, obtaining, from the external server, marker information relating to the designated marker, wherein the obtained marker information comprises a reference size and shape of the designated marker and an identification of a plurality of other markers related to the designated marker, wherein the marker information in the external server is based on the identified type of the designated marker;
   ascertaining a size and shape of the extracted marker from an analysis of the extracted marker;
   correcting for a distortion caused by an orientation of the designated marker relative to the endpoint device and an orientation of the endpoint device relative to the designated marker;
   determining an actual shape and an actual size of the designated marker based on one or more geometric elements located on the designated marker;
   comparing the actual shape and the actual size of the designated marker to the obtained reference size and shape of the designated marker;

calculating relative positional information of the endpoint device in relation to the extracted marker from an analysis of differences between the ascertained size and shape of the extracted marker and the obtained reference size and shape of the designated marker;

determining a relative position between the designated marker and each marker of the plurality of other markers displaying an informational image on the display unit, wherein the displayed image comprises the designated marker and at least one other marker of the plurality of other markers, and wherein the designated marker and the at least one other marker are displayed in accordance with a determined relative position between the designated marker and each marker of the at least one other marker; and presenting the prioritized additional information added to the designated marker.

2. The method of claim 1, wherein said identifying the type of the designated marker comprises:
   identifying a symbolic element existing within the extracted marker and
   identifying the type of the designated marker from the identified symbolic element.

3. The method of claim 1,
   wherein the obtained marker information further comprises additional information pertaining to the designated marker and additional information pertaining to each marker of the plurality of other markers, and
   wherein the displayed image further comprises (i) the additional information pertaining to and overlapping the designated marker and(ii) the additional information pertaining to and overlapping each marker of the plurality of other markers.

4. The method of claim 3, wherein the obtained marker information further comprises additional information pertaining to an outside marker that exists outside of an imaging range of the image acquiring unit, and wherein the displayed image further comprises the additional information pertaining to the outside marker.

5. The method of claim 4, wherein the additional information pertaining to the designated marker, the additional information pertaining to each marker of the plurality of other markers, and the additional information pertaining to the outside marker are displayed within a first object, a second object, and a third object, respectively, and wherein the first object, the second object, and the third object have different geometric shapes.

6. The method of claim 1, wherein the obtained marker information further comprises location information that includes positional information pertaining to the designated marker and positional information pertaining to each marker of the plurality of other markers, and wherein said determining the relative position between the designated marker and each marker of the plurality of other markers comprises utilizing the obtained location information.

7. The method of claim 6, wherein a totality of markers consists of the extracted marker and the plurality of other markers, wherein the obtained marker information further comprises a degree of importance of each marker of the totality of markers, wherein each degree of importance is expressed as a numerical value independently for each marker of the totality of markers, and wherein the method further comprises:

calculating relative positional information of the endpoint device in relation to the each marker of the plurality of other markers from an analysis of the obtained location information; and calculating a display order of the each marker of the totality of markers, wherein the display order of the each marker of the totality of markers is calculated as a function of (i) the relative positional information of the endpoint device in relation to the each marker of the totality of markers and (ii) the degree of importance of the each marker of the totality of markers .

8. The method of claim 7, wherein the relative positional information of the endpoint device in relation to the each marker of the totality of markers comprises (i) a distance between the endpoint device and the each marker of the totality of markers and (ii) an angle between an optical axis of the image acquiring unit and a direction of the each marker of the totality of markers as viewed from the endpoint device.

9. The method of claim 7, wherein the displayed at least one marker consists of one or more markers of the totality of markers whose calculated display order is less than a specified threshold.

10. A computer program product, comprising a memory unit having computer readable program code stored therein, said program code containing instructions which, upon being executed by an endpoint device that comprises an image acquiring unit and a display unit, implements a method for displaying information relating to a designated marker, said method comprising:

acquiring, by the image acquiring unit, an image including the designated marker;

extracting the designated marker from the acquired image;

identifying a type of the designated marker from the extracted marker;

identifying additional information on the designated marker;

prioritizing the additional information;

communicating the identified type of the designated marker to a server external to the endpoint device;

in response to the communicating, obtaining, from the external server, marker information relating to the designated marker, wherein the obtained marker information comprises a reference size and shape of the designated marker and an identification of a plurality of other markers related to the designated marker, wherein the marker information in the external server is based on the identified type of the designated marker;

ascertaining a size and shape of the extracted marker from an analysis of the extracted marker;

correcting for a distortion caused by an orientation of the designated marker relative to the endpoint device and an orientation of the endpoint device relative to the designated marker;

determining an actual shape and an actual size of the designated marker based on one or more geometric elements located on the designated marker;

comparing the actual shape and the actual size of the designated marker to the obtained reference size and shape of the designated marker;

calculating relative positional information of the endpoint device in relation to the extracted marker from an analysis of differences between the ascertained size and shape of the extracted marker and the obtained reference size and shape of the designated marker;

determining a relative position between the designated marker and each marker of the plurality of other markers displaying an informational image on the display unit, wherein the displayed image comprises the designated marker and at least one other marker of the plurality of other markers, and wherein the designated marker and the at least one other marker are displayed in accordance with a determined relative position between the designated marker and each marker of the at least one other marker; and presenting the prioritized additional information added to the designated marker.

11. The computer program product of claim 10, wherein said identifying the type of the designated marker comprises:

identifying a symbolic element existing within the extracted marker; and identifying the type of the designated marker from the identified symbolic element.

12. The computer program product of claim 10, wherein the obtained marker information further comprises additional information pertaining to the designated marker and additional information pertaining to each marker of the plurality of other markers, and wherein the displayed image further comprises (i) the additional information pertaining to and overlapping the designated marker and (ii) the additional information pertaining to and overlapping each marker of the plurality of other markers.

13. The computer program product of claim 12, wherein the obtained marker information further comprises additional information pertaining to an outside marker that exists outside of an imaging range of the image acquiring unit, and wherein the displayed image further comprises the additional information pertaining to the outside marker.

14. The computer program product of claim 13, wherein the additional information pertaining to the designated marker, the additional information pertaining to each marker of the plurality of other markers, and the additional information pertaining to the outside marker are displayed within a first object, a second object, and a third object, respectively, and wherein the first object, the second object, and the third object have different geometric shapes.

15. The computer program product of claim 10, wherein the obtained marker information further comprises location information that includes positional information pertaining to the designated marker and positional information pertaining to each marker of the plurality of other markers, and wherein said determining the relative position between the designated marker and each marker of the plurality of other markers comprises utilizing the obtained location information.

16. A system, comprising an endpoint device, said endpoint device comprising an image acquiring unit, a display unit, and a memory unit having computer readable program code stored therein, said program code containing instructions which, upon being executed by the endpoint device, implements a method for displaying information relating to a designated marker, said method comprising:

acquiring, by the image acquiring unit, an image including the designated marker;

extracting the designated marker from the acquired image;

identifying a type of the designated marker from the extracted marker;

identifying additional information on the designated marker;

prioritizing the additional information;

communicating the identified type of the designated marker to a server external to the endpoint device;

in response to the communicating, obtaining, from the external server, marker information relating to the designated marker, wherein the obtained marker information comprises a reference size and shape of the designated marker and an identification of a plurality of other markers related to the designated marker, wherein the marker information in the external server is based on the identified type of the designated marker;

ascertaining a size and shape of the extracted marker from an analysis of the extracted marker;

correcting for a distortion caused by an orientation of the designated marker relative to the endpoint device and an orientation of the endpoint device relative to the designated marker;

determining an actual shape and an actual size of the designated marker based on one or more geometric elements located on the designated marker;

comparing the actual shape and the actual size of the designated marker to the obtained reference size and shape of the designated marker;

calculating relative positional information of the endpoint device in relation to the extracted marker from an analysis of differences between the ascertained size and shape of the extracted marker and the obtained reference size and shape of the designated marker;

determining a relative position between the designated marker and each marker of the plurality of other markers displaying an informational image on the display unit, wherein the displayed image comprises the designated marker and at least one other marker of the plurality of other markers, and wherein the designated marker and the at least one other marker are displayed in accordance with a determined relative position between the designated marker and each marker of the at least one other marker; and presenting the prioritized additional information added to the designated marker.

17. The system of claim 16, wherein said identifying the type of designated marker comprises:

identifying a symbolic element existing within the extracted marker; and identifying the type of the designated marker from the identified symbolic element.

18. The system of claim 16, wherein the obtained marker information further comprises additional information pertaining to the designated marker and additional information pertaining to each marker of the plurality of other markers, and wherein the displayed image further comprises (i) the additional information pertaining to and overlapping the designated marker and (ii) the additional information pertaining to and overlapping each marker of the plurality of other markers.

19. The system of claim 18, wherein the additiona information further comprises additional information pertaining to an outside marker that exists outside of an imaging range of the image acquiring unit, and wherein the displayed image further comprises the additional information pertaining to the outside marker.

20. The system of claim 19, wherein the additional information pertaining to the designated marker, the additional information pertaining to each marker of the purality of other markers, and the additional information pertaining to the outside marker are displayed within a first object, a second object, and a third object, respectively, and wherein the first object, the second object, and the third object have different geometric shapes.

* * * * *